United States Patent
Weller

(10) Patent No.: US 8,814,246 B2
(45) Date of Patent: Aug. 26, 2014

(54) TRUCK BED STORAGE SYSTEM

(75) Inventor: Kip D Weller, St. Charles, IL (US)

(73) Assignee: Kip D. Weller, St. Charles, IL (US)

( * ) Notice: Subject to any disclaimer, the term of this patent is extended or adjusted under 35 U.S.C. 154(b) by 0 days.

(21) Appl. No.: 13/445,026

(22) Filed: Apr. 12, 2012

(65) Prior Publication Data

US 2013/0270854 A1    Oct. 17, 2013

(51) Int. Cl.
*B60R 9/06* (2006.01)
*B62D 33/03* (2006.01)

(52) U.S. Cl.
USPC ............... 296/37.6; 296/100.08; 296/57.1

(58) Field of Classification Search
USPC ......... 296/37.6, 100.08, 100.3, 57.1; 410/145
See application file for complete search history.

(56) References Cited

U.S. PATENT DOCUMENTS

| | | | |
|---|---|---|---|
| 4,288,011 A | 9/1981 | Grossman | |
| 4,394,100 A | 7/1983 | Sperlich | |
| 4,733,898 A | 3/1988 | Williams | |
| 4,844,305 A | 7/1989 | McKneely | |
| 5,080,250 A | 1/1992 | Dickinson et al. | |
| 5,324,089 A * | 6/1994 | Schlachter | 296/37.5 |
| 5,464,264 A | 11/1995 | Wilson | |
| 5,603,439 A | 2/1997 | Pineda | |
| 5,628,442 A | 5/1997 | Wayne | |
| 5,685,593 A | 11/1997 | O'Connor | |
| 5,845,953 A | 12/1998 | Rusnock | |
| 5,890,856 A * | 4/1999 | Huang | 410/151 |
| 5,927,783 A | 7/1999 | Baka | |
| 5,964,495 A | 10/1999 | Blanton | |
| 6,010,046 A | 1/2000 | Neeser | |
| 6,068,319 A | 5/2000 | O'brien | |
| 6,077,007 A | 6/2000 | Porter et al. | |
| 6,113,176 A * | 9/2000 | Bernardo | 296/100.01 |
| 6,186,575 B1 * | 2/2001 | Fisher et al. | 296/100.03 |
| 6,241,137 B1 | 6/2001 | Corr | |
| 6,283,526 B1 | 9/2001 | Keough et al. | |
| 6,361,097 B1 | 3/2002 | Lechkun | |
| 6,634,691 B2 | 10/2003 | Henderson | |
| 6,641,013 B2 * | 11/2003 | Dise | 224/404 |
| 6,695,375 B1 * | 2/2004 | May | 296/37.6 |
| 6,783,169 B1 | 8/2004 | Marx et al. | |
| 6,824,184 B2 * | 11/2004 | Leitner et al. | 296/37.6 |
| 6,827,385 B2 | 12/2004 | Mobley | |
| 6,827,533 B2 | 12/2004 | Cano-rodriguez et al. | |
| 6,886,876 B1 | 5/2005 | Damian | |
| 6,929,303 B1 | 8/2005 | Sharples | |
| 6,942,269 B2 | 9/2005 | Mains | |
| 6,948,755 B1 | 9/2005 | Bauer | |
| 6,948,760 B2 | 9/2005 | Marx et al. | |
| 7,004,530 B2 | 2/2006 | Marx et al. | |

(Continued)

*Primary Examiner* — Dennis H Pedder
*Assistant Examiner* — Beverly Becker
(74) *Attorney, Agent, or Firm* — Evan D. Linderman

(57) ABSTRACT

A system is provided for storing items in the bed of a pickup truck. The system includes storage bins, storage bin covers, storage bin dividers, and a removable cover. The storage bins may be divided by the storage bin dividers, and items within the storage bins may be protected from the elements, and from theft, by the storage bin covers. The removable cover may fit in between the storage bin covers and provide a flat storage surface in conjunction with the storage bin covers, that provides the full truck bed area for additional storage of larger items. The removable cover also provides for storage underneath the removable cover such that long, irregularly shaped, or valuable items may be stored securely and be protected from the elements, and from theft.

9 Claims, 21 Drawing Sheets

(56) References Cited

U.S. PATENT DOCUMENTS

| | | |
|---|---|---|
| 7,121,601 B2 | 10/2006 | Mulvihill et al. |
| RE40,004 E | 1/2008 | Mains |
| 7,404,586 B2 | 7/2008 | Seiberling |
| 7,410,335 B2 | 8/2008 | Scott et al. |
| 7,794,003 B2 * | 9/2010 | Crandall ............... 296/37.6 |
| 8,070,029 B1 | 12/2011 | Settle |
| 2010/0320245 A1 * | 12/2010 | Vilkomirski et al. ........ 224/404 |

* cited by examiner

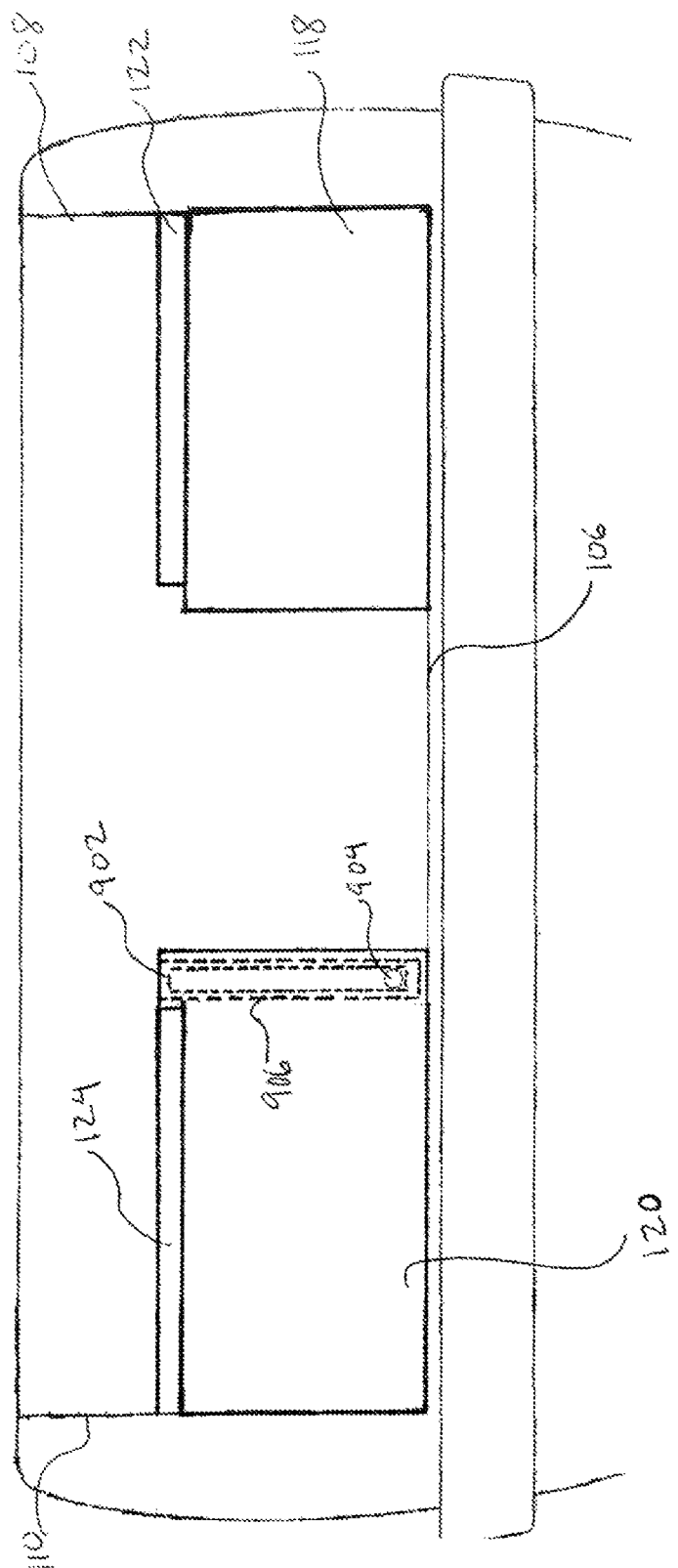

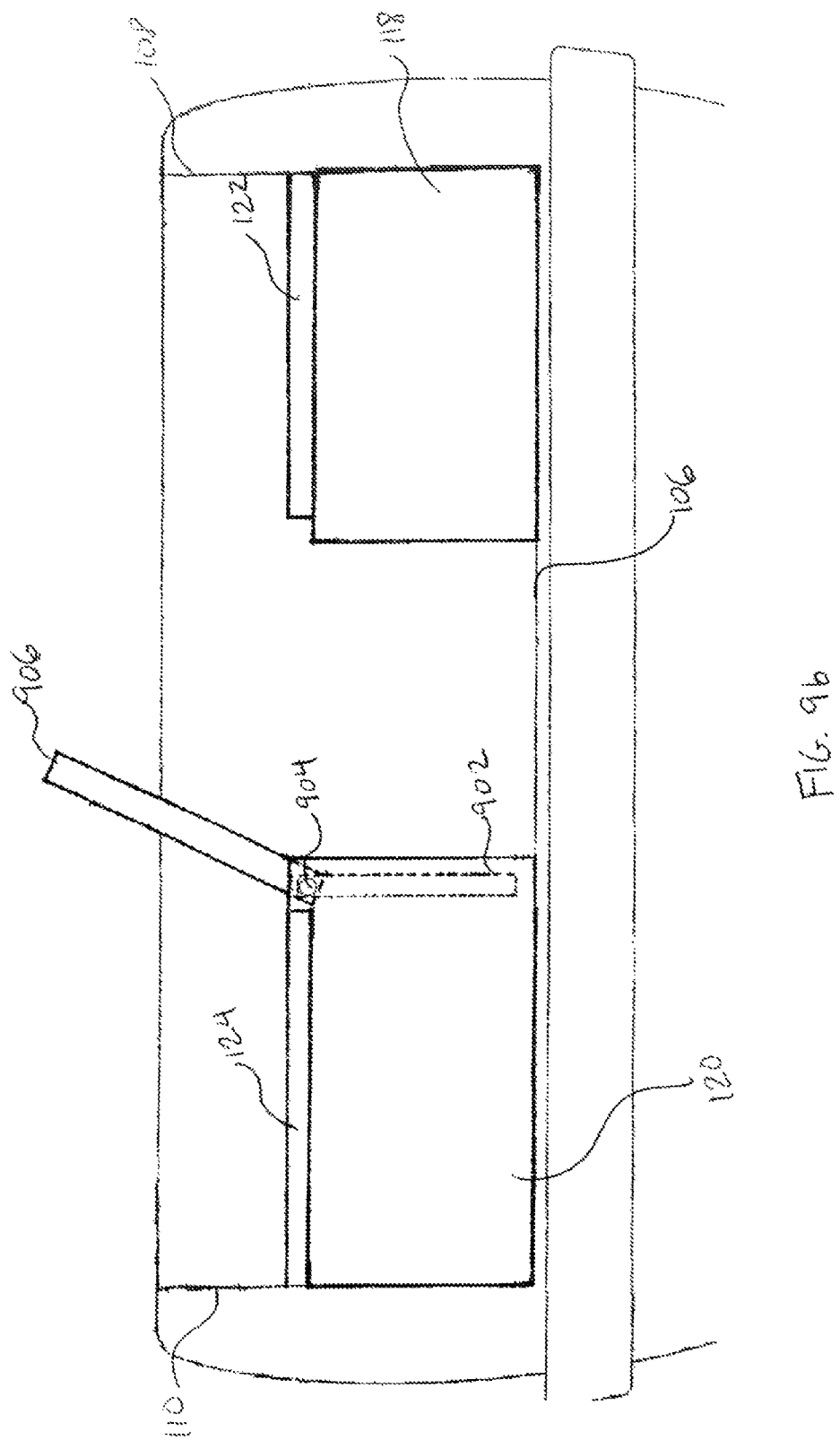

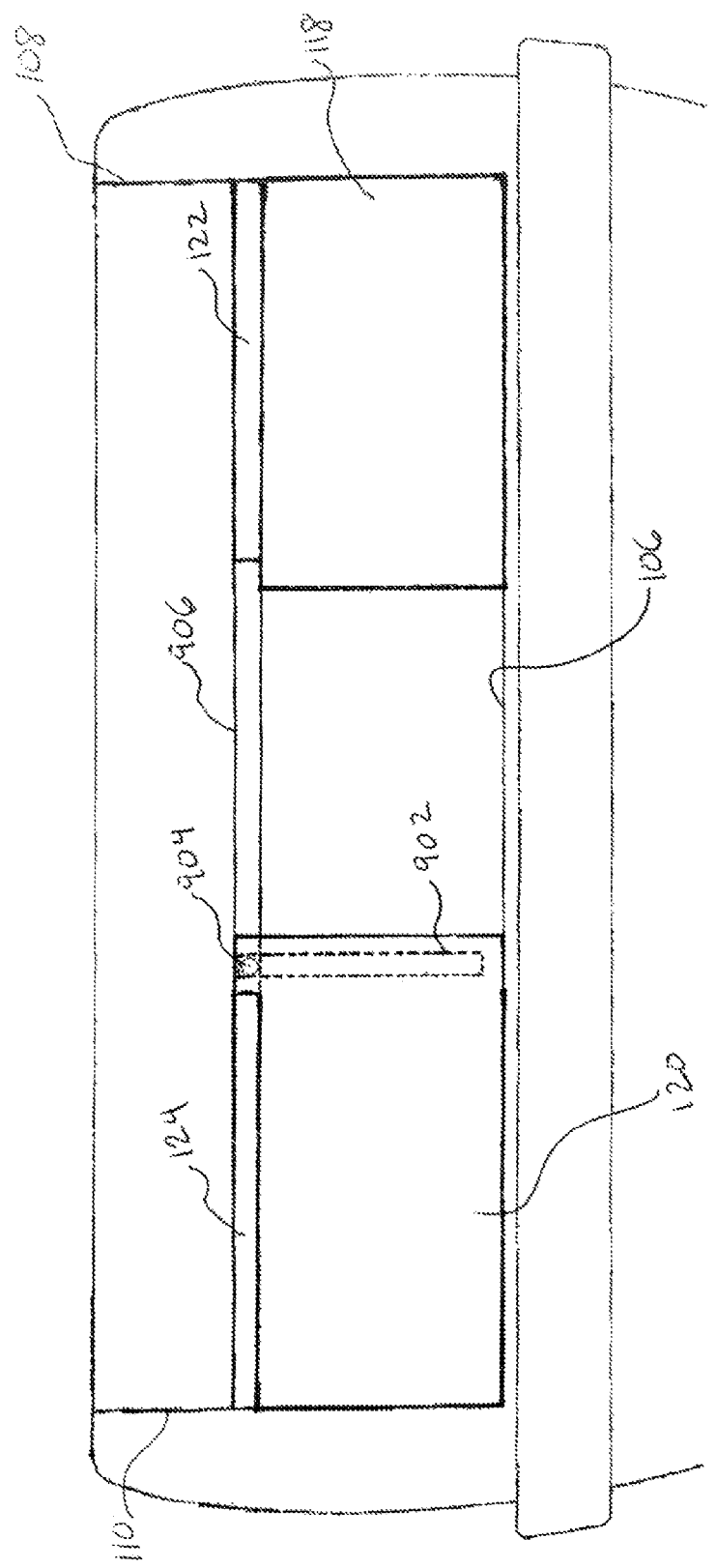

TRUCK BED STORAGE SYSTEM

TECHNICAL FIELD

The present invention relates to systems and methods for storing items. More particularly, it relates to systems and methods for storing items in the bed of a pickup truck.

BACKGROUND OF THE INVENTION

Pickup trucks are useful vehicles for transporting large items or materials. Most pickup truck beds are designed to fit large, flat construction materials like drywall or plywood that are offered in 4'×8' sizes.

While the ability to fit large, flat items is beneficial, many truck owners need to transport smaller items that do not occupy most of the space in a truck bed. As a result, aftermarket pickup truck bed storage systems have been developed in order to provide the ability to store smaller items in the truck bed as well.

U.S. Pat. No. 5,080,250 (Dickinson et. al.) discloses a plastic box that is mounted to the bed of a pickup truck for secure, waterproof storage of items.

U.S. Pat. No. 6,886,876 (Gerald) discloses a multi-compartment, bed-mounted box that can be adjusted to accommodate different types of truck beds.

U.S. Pat. No. 4,288,011 (Grossman) describes a watertight container that can be mounted on top of the rails of the truck bed. The containers can be adjusted for the height of the rails and can telescope to provide larger or smaller storage spaces, depending on the needs of the user.

U.S. Pat. No. 6,641,013 (Dise) discloses a modular container system for a pickup truck bed for tool storage. Containers can be added or removed as needed, and the system can occupy the entire truck bed, if desired by the user.

U.S. Pat. No. 4,733,898 (Williams) describes a storage system with multiple compartments that fits snugly on to the bed of a pickup truck and raises the effective bed height by about 12 inches.

U.S. Pat. No. 4,394,100 (Sperlich) discloses a system to provide multiple levels of storage in a pickup truck bed, and provides secure storage for the lower level when the tailgate is closed.

U.S. Pat. No. 6,942,269 (Mains) describes a system to provide multiple levels of storage in a pickup truck bed, in which the height of the levels can be adjusted.

U.S. Pat. No. 6,241,137 (Corr) describes a removable system designed to provide multiple levels of storage in a pickup truck bed.

The systems referenced above do not provide the user ultimate flexibility in changing the type of items being transported. Some systems provide the ability to store smaller items in boxes, while other systems provide the ability to store large, flat items on a flat surface that is raised above the bed of the truck. However, there is not a system that provides the user the ability to effectively and securely store small items, large or oddly shaped items, and construction items such as drywall or plywood all at the same time, where such flexibility and modularity is integrated into a single system.

There exists a need in the market for an improved storage system for the bed of a pickup truck. The present invention provides an efficient system of effectively and securely transporting various sized items within the bed of a pickup truck.

BRIEF SUMMARY OF THE INVENTION

Benefits achieved in accordance with principles of the disclosed invention include a storage system for the bed of a pickup truck that can effectively and securely store small items, large or oddly shaped items, and construction items such as drywall or plywood all at the same time, where such flexibility and modularity is integrated into a single system.

Some aspects of the present invention relate to storage bins, storage bin covers, and storage bin dividers. The storage bin covers protect items stored within the storage bins from the elements, and may also provide a watertight seal with the storage bins. The storage bin dividers can be arranged within the storage bins to create smaller sections in which to store and transport smaller items.

Other aspects of the present invention relate to spacers used to secure the storage bins to the bed of the pickup truck. The spacers are telescoping, which provides the ability to use the spacers with storage bins or pickup truck beds of different sizes. The spacers also provide the ability to secure the storage bins to the bed of the pickup truck without the use of fasteners of any kind, leaving the pickup truck unmarred by the use of the storage bins.

Yet other aspects of the present invention relate to a removable cover integrated with the storage system. When not in use, the removable cover is stowed either within the storage bins, on the walls of the pickup truck, or on the bed of the pickup truck. This configuration provides the ability to store small items in the storage bins, but still store large, or oddly shaped items (such as skis, golf clubs, or a motorcycle) in the available space in between the storage bins. When in use, the removable cover is deployed such that it creates a flat surface with the storage bin covers which is raised above the bed of the pickup truck, and is essentially the same size as the bed of the pickup truck. This configuration provides the ability to simultaneously store small items in the storage bins, securely store large or oddly shaped items underneath the removable cover and in between the storage bins, and store large construction items (like drywall or plywood) on the flat surface created by the removable cover and the storage bin covers.

Still other aspects of the present invention relate to straps or brackets to secure large construction items on top of the flat surface created by the removable cover and the storage bin covers. When large construction items are placed on top of the flat surface, the straps can be connected to each other and then tightened in order to prevent the items from shifting during transportation. The brackets are biased toward the center of the truck, and when large construction items are pushed on to the flat surface, they push the brackets toward the sides of the truck, and the bias of the brackets provides a force to prevent the items from shifting during transportation.

BRIEF DESCRIPTION OF THE DRAWINGS

FIG. 5b is a cross section of the spacer of FIG. 5a;

FIG. 9a is a rear view of the storage system of FIG. 1 with an integrated cover in a first configuration according to another preferred embodiment of the present invention;

FIG. 9b is a rear view of the storage system of FIG. 1 with an integrated cover in a second configuration according to a preferred embodiment of the present invention;

FIG. 9c is a rear view of the storage system of FIG. 1 with an integrated cover in a third configuration according to a preferred embodiment of the present invention;

DETAILED DESCRIPTION OF THE INVENTION

Figure 1:
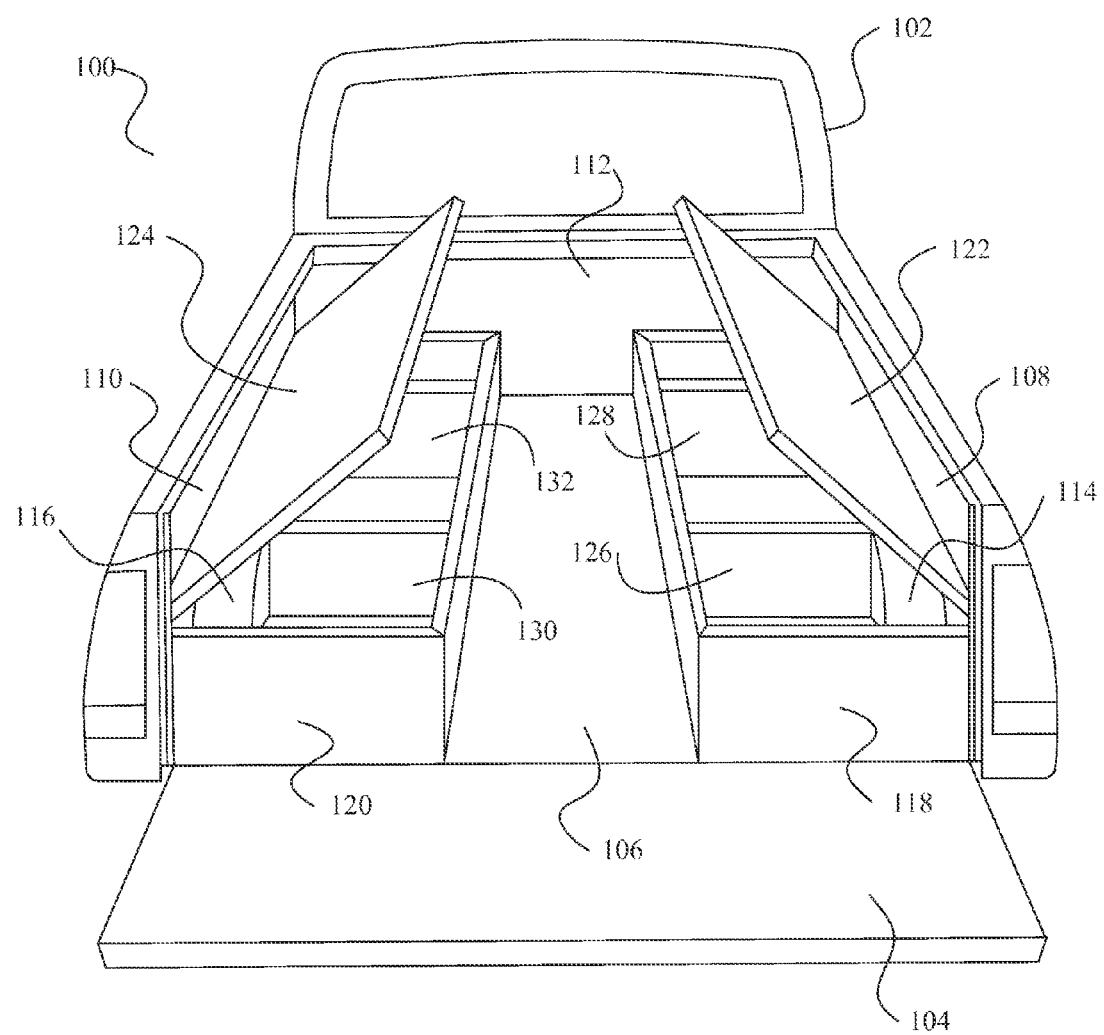
FIG. 1 is a perspective view of storage bins in the bed of a pickup truck with wheel wells according to a preferred embodiment of the present invention.

FIG. 1 illustrates storage system 100. As shown in the figure, storage system 100 includes pickup truck 102. Pickup truck 102 includes tailgate 104, bed 106, side walls 108 and 110, back wall 112, and wheel wells 114 and 116.

Storage system 100 also includes storage bins 118 and 120, bin covers 122 and 124, and bin dividers 126-132.

Tailgate 104 is operable to open and close, and may be locked when in the closed position. In the open position, as shown in FIG. 1, a user can access items located on bed 106 or even climb onto tailgate 104 and onto bed 106. In the closed position, tailgate 104 prevents easy access to bed 106 and prevents items in bed 106 from rolling out of truck 102.

In combination with tailgate 104 in a closed position, side walls 108 and 110, back wall 112 and bed 106 form an enclosure in which items can be stored.

Storage bins 118 and 120 are preferably constructed from plastic or metal, but may be constructed from any material suitable for storing items in an outdoor environment. As shown in FIG. 1, storage bins 118 and 120 extend the entire length of bed 106; however storage bins 118 and 120 may only extend for a portion of the length of bed 106, depending on the configuration of system 100. Additionally, storage bins 118 and 120 are shown with a rectangular shape; however other shapes (square, oval, or any other shape suitable for the application) may be used. The shape of storage bins 118 and 120 is also designed to fit with wheel wells 114 and 116 such that wheel wells 114 and 116 do not interfere with installation of storage bins 118 and 120. The shape may be contoured to match the shape of wheel wells 114 and 116, as shown in FIG. 1; however a rectangular or square shape may also be employed to take advantage of more streamlined manufacturing. Additionally, it may be beneficial to provide storage bins 118 and 120 with a standardized shape for side walls 108 and 110 to cover wheel wells of various sizes.

Bin dividers 126-132 are operable to fit within storage bins 118 and 120 and provide a user the ability to subdivide bins 118 and 120 in order to better match the size of the items being stored. Bin dividers 126-132 will be further described with reference to FIGS. 13-14.

Bin covers 122 and 124 are operable to cover storage bins 118 and 120 to provide protection for items stored within storage bins 118 and 120. Bin covers 122 and 124 are preferably constructed from plastic or metal, but may be constructed from any material suitable for storing items in an outdoor environment. As shown in FIG. 1, bin covers 122 and 124 are constructed as single sheets of material that cover storage bins 118 and 120, however bin covers 122 and 124 may be constructed of multiple sheets of material that can open and close independently of one another, such that the entire bin cover does not need to be opened to locate an item in a specific area of storage bins 118 and 120. Bin covers 122 and 124 are preferably connected to storage bins 118 and 120 by hinges, however any other standard means of connecting a cover to a bin may be employed. As shown in FIG. 1, bin covers 122 and 124 are configured to open toward side walls 108 and 110, respectively. In another embodiment, bin covers 122 and 124 may be configured to open toward back wall 112. Additionally, bin covers 122 and 124 may include a gasket material (not shown) designed to seal around the edges of storage bins 118 and 120 in order to prevent liquid from entering bins 118 and 120. Bin covers 122 and 124 may be locked to storage bins 118 and 120 to provide security for items stored within storage bins 118 and 120. Locking mechanisms to provide security will be further described with reference to FIGS. 11*a-c*.

In operation, storage system 100 provides the user the flexibility to securely store smaller items in storage bins 118 and 120, while still providing an open section on bed 106 in between storage bins 118 and 120 to store long or oddly shaped items. Items that may be stored on bed 106 in the open section between storage bins 118 and 120 include skis, tall plants, motorcycles, or any other item that may not fit well within storage bins 118 and 120.

Figure 2:
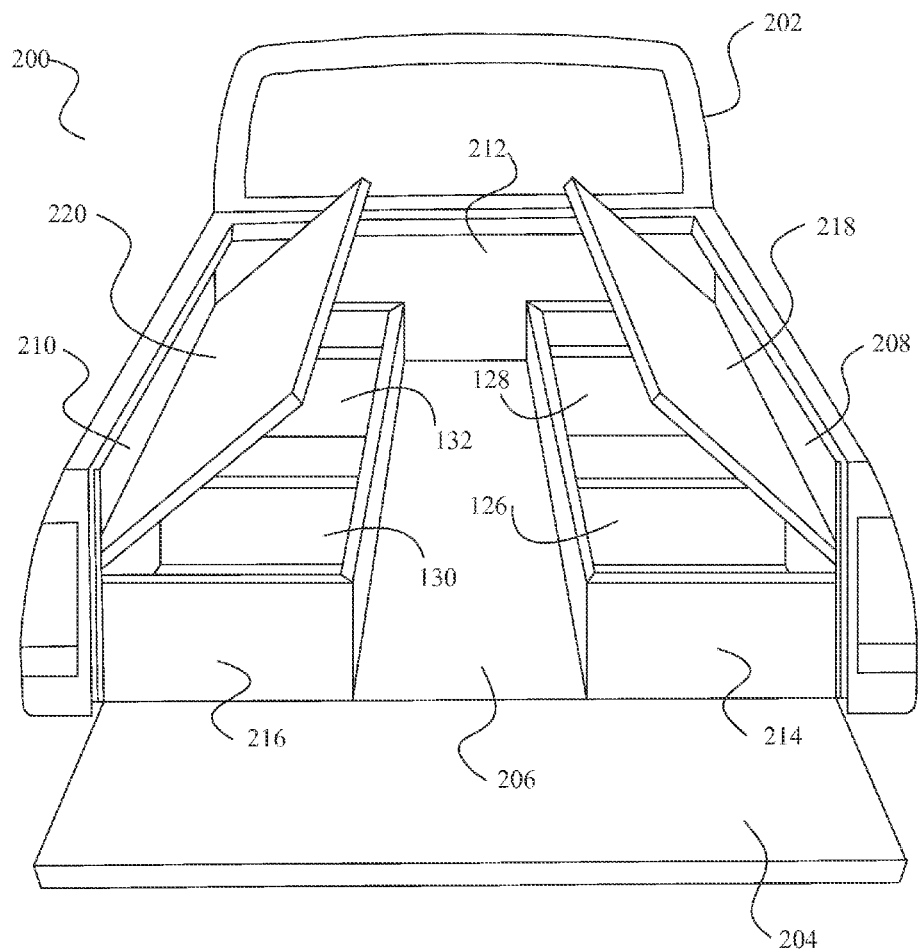
FIG. 2 is a perspective view of storage bins in the bed of a pickup truck without wheel wells according to a preferred embodiment of the present invention.

FIG. 2 illustrates storage system 200. As shown in the figure, storage system 200 includes pickup truck 202. Pickup truck 202 includes tailgate 204, bed 206, side walls 208 and 210 and back wall 212.

Storage system 200 also includes storage bins 214 and 216, bin covers 218 and 220, and bin dividers 126-132.

Tailgate 204 is operable to open and close. In the open position, as shown in FIG. 2, a user can access items located on bed 206 or even climb onto tailgate 204 and onto bed 206. In the closed position, tailgate 204 prevents easy access to bed 206 and prevents items in bed 206 from rolling out of truck 202.

In combination with tailgate 204 in a closed position, side walls 208 and 210, back wall 212 and bed 206 form an enclosure in which items can be stored.

Storage bins 214 and 216 are preferably constructed from plastic or metal, but may be constructed from any material suitable for storing items in an outdoor environment. As shown in FIG. 2, storage bins 214 and 216 extend the entire length of bed 206; however storage bins 214 and 216 may only extend for a portion of the length of bed 206, depending on the configuration of system 200. Additionally, storage bins 214 and 216 are shown with a rectangular shape; however other shapes (square, oval, or any other shape suitable for the application) may be used.

Bin covers 218 and 220 are operable to cover storage bins 214 and 216 to provide protection for items stored within storage bins 214 and 216. Bin covers 218 and 220 are preferably constructed from plastic or metal, but may be constructed from any material suitable for storing items in an outdoor environment. As shown in FIG. 2, bin covers 218 and 220 are constructed as single sheets of material that cover storage bins 214 and 216, however bin covers 218 and 220 may be constructed of multiple sheets of material that can open and close independently of one another, such that the entire bin cover does not need to be opened to locate an item in a specific area of storage bins 214 and 216. Bin covers 218 and 220 are preferably connected to storage bins 214 and 216 by hinges, however any other standard means of connecting a cover to a bin may be employed. As shown in FIG. 2, bin covers 218 and 220 are configured to open toward side walls 208 and 210, respectively. In another embodiment, bin covers 218 and 220 may be configured to open toward back wall 212. Additionally, bin covers 218 and 220 may include a gasket material (not shown) designed to seal around the edges of storage bins 118 and 120 in order to prevent liquid from entering bins 214 and 216. Bin covers 218 and 220 may be locked to storage bins 214 and 216 to provide security for items stored within storage bins 214 and 216. Locking mechanisms to provide security will be further described with reference to FIGS. 11*a-c*.

In operation, storage system 200 provides the user the flexibility to securely store smaller items in storage bins 214 and 216, while still providing an open section on bed 206 in between storage bins 214 and 216 to store long or oddly shaped items. Items that may be stored on bed 206 in the open section between storage bins 214 and 216 include skis, tall plants, motorcycles, or any other item that may not fit well within storage bins 214 and 216.

It can be appreciated that the following descriptions could apply to the storage systems of both FIG. 1 and FIG. 2, however for purposes of brevity the following descriptions will be discussed with reference to the storage system of either FIG. 1 or FIG. 2. Any of the following descriptions discussed with reference to the storage system of FIG. 1 would also apply to the storage system of FIG. 2, and any of the following descriptions discussed with reference to the storage system of FIG. 2 would also apply to the storage system of FIG. 1.

Figure 3:
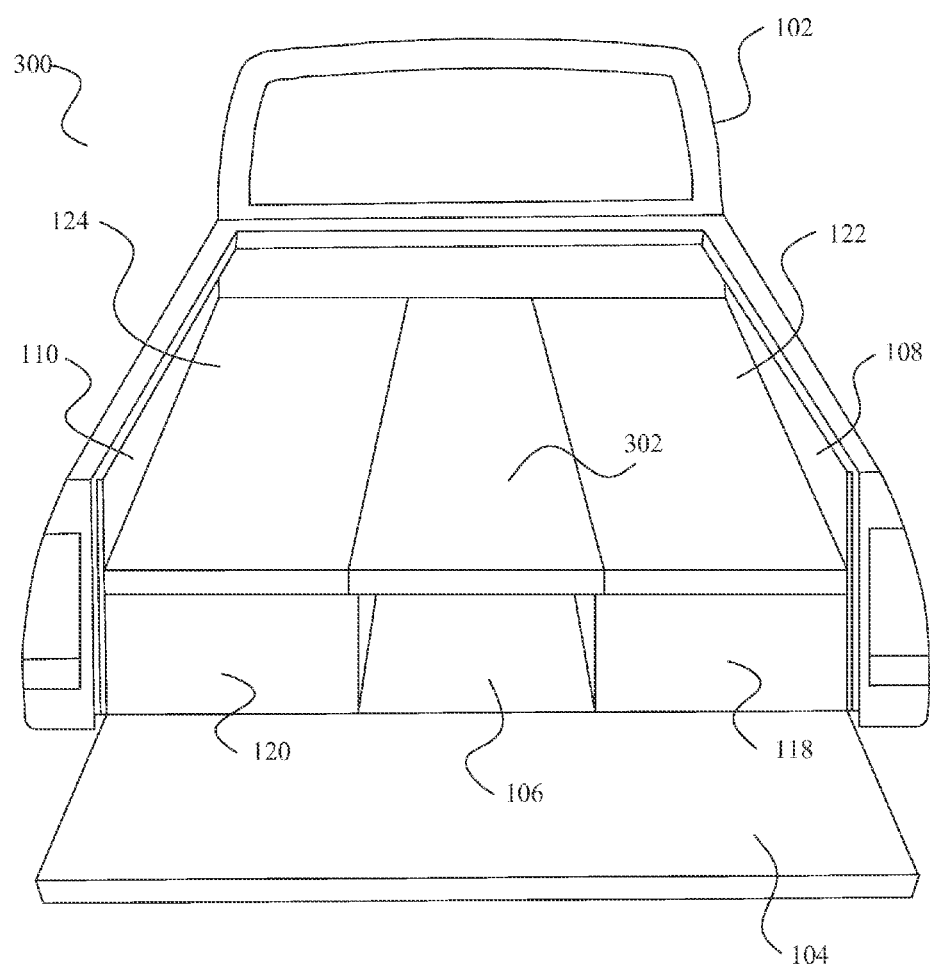
FIG. 3 is a perspective view of the storage system of FIG. 1 with a removable cover in place according to a preferred embodiment of the present invention.

FIG. 3 illustrates the storage system of FIG. 1 with a removable cover in place according to a preferred embodiment of the present invention.

As shown in the figure, storage system 300 includes removable cover 302 in addition to all elements described with reference to FIG. 1 (with bin dividers 126-132 not shown).

Removable cover 302 is preferably constructed from plastic or metal, but may be constructed from any material suitable for storing items in an outdoor environment. Removable cover 302 may be constructed from a single piece of material or multiple pieces of material, and it may be flexible or rigid.

In operation, removable cover 302 fits in between bin covers 122 and 124 to cover the open section of bed 106 in between storage bins 118 and 120. This configuration accomplishes two goals. First, bin covers 122 and 124 along with removable cover 302 create a flat surface upon which large, flat items can be placed. For example, construction items like drywall or plywood that are typically sold in 4'×8' sizes can be stacked on top of the flat surface provided by the combination of bin covers 122 and 124 and removable cover 302. Second, when removable cover 302 is in place in between bin covers 122 and 124, another secure storage section is created in the open section of bed 106, in which long items, such as skis or golf clubs, can be safely stored.

When removable cover 302 is not needed, it is stored within storage system 300, such that storage system 300 looks very much like storage system 100 of FIG. 1. Removable cover 302 may be connected directly to storage bins 118 or 120 or to bin covers 122 or 124, such that it can be stowed on or within storage bins 118 or 120 or bin covers 122 or 124. Removable cover 302 may also be independent of storage bins 118 and 120 and bin covers 122 and 124 such that it can be dropped into place as shown in FIG. 3 and stowed either on bed 106, on bin covers 122 or 124, or within storage bins 118 or 120 when not in use. Specific examples of preferred embodiments of removable cover 302 will be further described with reference to FIGS. 7-10.

Figure 4A:
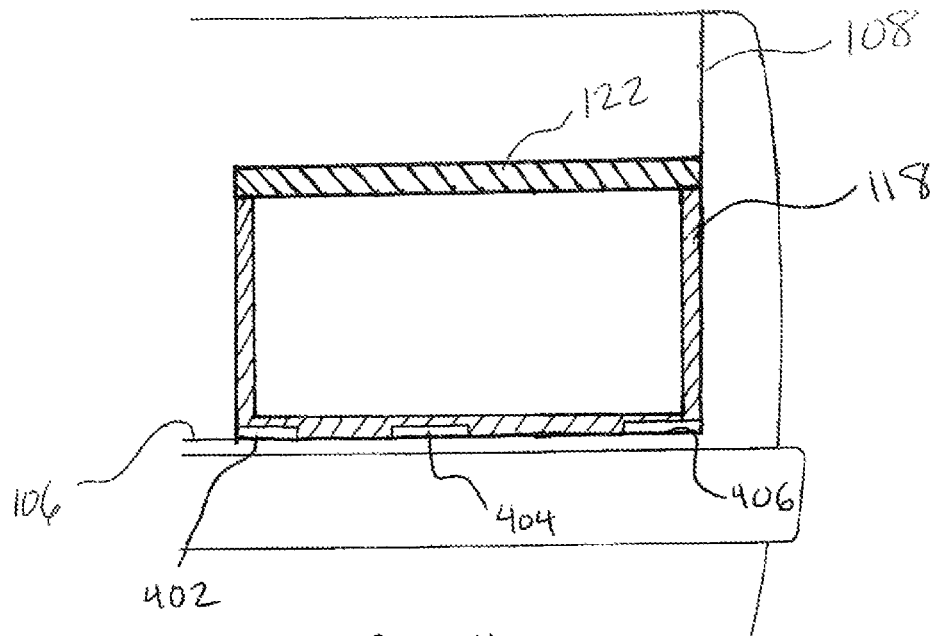
FIG. 4a is a cross section of a storage bin of FIG. 1 and its connection to the bed of a pickup truck according to a preferred embodiment of the present invention.

FIG. 4*a* is a cross section of a storage bin of FIG. 1 and its connection to the bed of a pickup truck according to a preferred embodiment of the present invention.

As shown in the figure, storage bin 118 is attached to bed 106 by adhesive fasteners 402-406. Adhesive fasteners 402-406 may include various types of glue (cyanoacrylate, 1-part epoxy, 2-part epoxy, and other glues known in the art) that are strong enough to assure that storage bin 118 will remain in place. Adhesive fasteners 402-406 may also include other non-mechanical fasteners such as hook-and-loop.

In operation, the underside of storage bin 118 is provided with recesses which are sized to receive adhesive fasteners 402-406. In order to secure storage bin 118 to bed 106, adhesive fasteners 402-406 must have adhesive on two surfaces. One adhesive surface will adhere to bed 106, and the other adhesive surface will adhere to storage bin 118 within the recesses provided.

To attach storage bin 118 to bed 106, a user would first apply adhesive fasteners 402-406 to storage bin 118 within the recesses provided. Then, the user would position storage bin 118 in the desired location and apply adhesive fasteners 402-406 to bed 106 by pressing storage bin 118 down on to bed 106.

In this example, three different adhesive fasteners were used, however, it can be appreciated that the number, size and location of adhesive fasteners may change based on the size and/or materials of construction of storage bin 118.

Figure 4B:
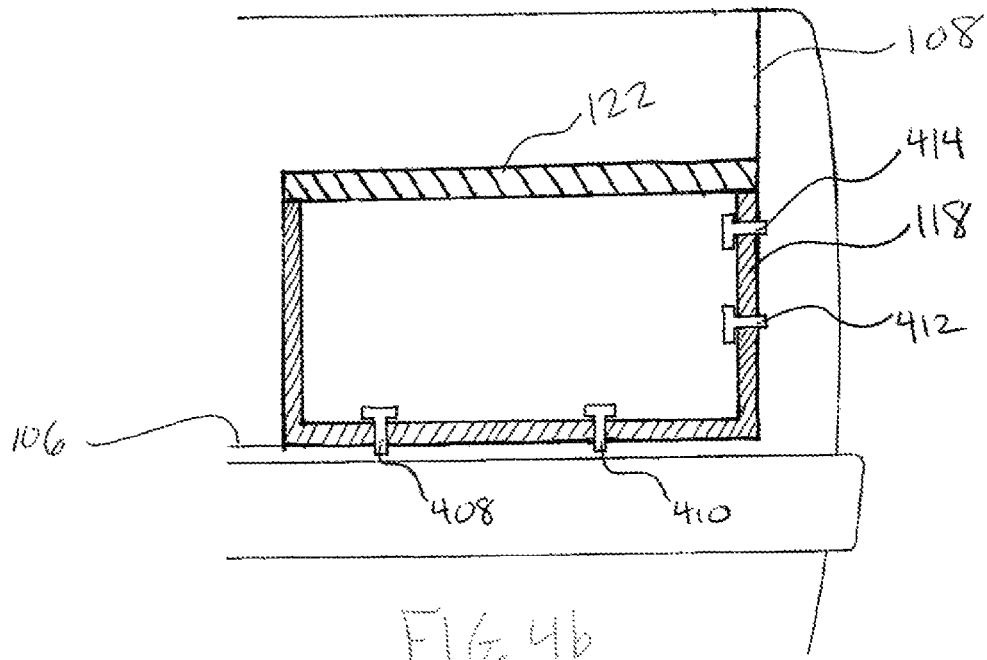
FIG. 4b is a cross section of a storage bin of FIG. 1 and its connection to the bed of a pickup truck according to another preferred embodiment of the present invention.

FIG. 4b is a cross section of a storage bin of FIG. 1 and its connection to the bed of a pickup truck according to another preferred embodiment of the present invention.

As shown in the figure, storage bin 118 is attached to bed 106 by mechanical fasteners 408-414. Mechanical fasteners 408-414 may include various types of fasteners (nails, screws, bolts, rivets, and other mechanical fasteners known in the art) that are strong enough to assure that storage bin 118 will remain in place.

In operation, the bottom and side of storage bin 118 is provided with holes which are sized to receive mechanical fasteners 408-414. In order to secure storage bin 118 to bed 106, storage bin 118 is first placed in the desired position on bed 106 and side wall 108, and then mechanical fasteners 408-414 are secured to storage bin 118, bed 106 and side wall 108.

In this example, four different mechanical fasteners were used, however, it can be appreciated that the number, size and location of mechanical fasteners may change based on the size and/or materials of construction of storage bin 118.

Figure 5A:
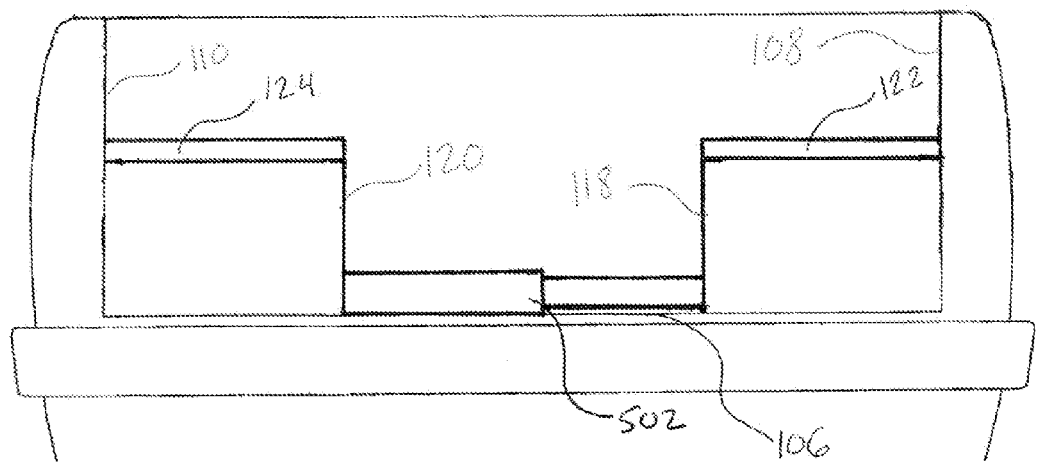
FIG. 5a is a rear view of the storage bins of FIG. 1 and a spacer according to a preferred embodiment of the present invention.

FIG. 5a is a rear view of the storage bins of FIG. 1 and a spacer according to a preferred embodiment of the present invention.

As shown in the figure, storage bins 118 and 120 are secured in place by spacer 502. Spacer 502 provides a constant pushing force that serves to constrain storage bins 118 and 120 against side walls 108 and 110, respectively.

Spacer 502 is preferably constructed from plastic or metal, but may be constructed from any material suitable for an outdoor environment. Spacer 502 may be a single piece of material sized to fit a specific combination of truck type and storage bin size, or it may be adjustable in order to accommodate many different combinations of truck type and storage bin size. An adjustable embodiment of spacer 502 will be described in greater detail with reference to FIG. 5b.

Figure 5B:
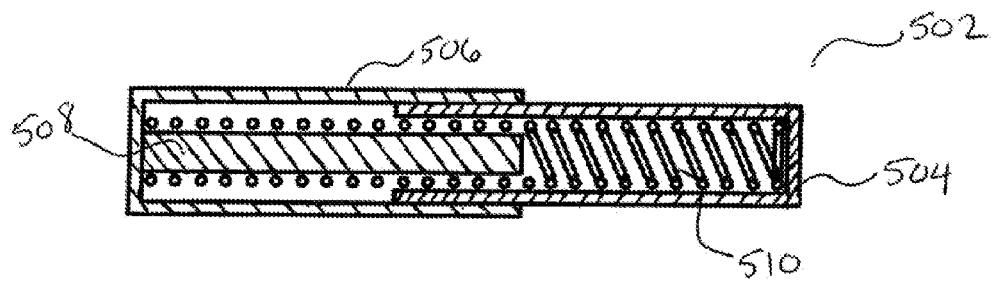

FIG. 5b is a cross section of the spacer of FIG. 5a.

As shown in the figure, spacer 502 includes inner tube 504, outer tube 506, spring post 508 and spring 510.

Inner tube 504, outer tube 506, spring post 508 and spring 510 are preferably constructed from plastic or metal, but may be constructed from any material suitable for an outdoor environment.

To assemble spacer 502, spring post 508 is attached to outer tube 506 by adhesive means (cyanoacrylate, 1-part epoxy, 2-part epoxy, hook-and-loop, etc.) or mechanical means (screws, bolts, rivets, nails, welding, brazing, etc.). Spring 510 is placed over spring post 508 until spring 510 contacts outer tube 506. Spring 510 may be bonded or connected to outer tube 506 by any means previously discussed, if desired. Inner tube 504 is placed over spring 510 until spring 510 contacts inner tube 504. Spring 510 may be bonded or connected to inner tube 504 by any means previously discussed, if desired.

In operation, a user would compress spring 510 by pushing outer tube 506 and inner tube 504 toward each other. Spring post 508 forces spring 510 to maintain a straight configuration during compression.

Returning to FIG. 5a, the user would place spacer 502 in its compressed configuration in between storage bins 118 and 120. When spacer 502 is in the desired location, the user can relax the force being used to compress the spring and allow the spring to push outer tube 506 and inner tube 504 away from each other. When inner tube 504 contacts storage bin 118 and outer tube 506 contacts storage bin 120, the force of the spring pushing against both outer tube 506 and inner tube 504 will constrain storage bins 118 and 120 against side walls 108 and 110, respectively. Using spacer 502 would negate the need for other types of connectors that may require the user to modify the truck to receive the connectors.

Utilizing spacer 502 would create an uneven surface on bed 106 such that it may be difficult to store long, large or oddly shaped items on bed 106 when spacer 502 is utilized. To overcome this issue, a flat board (constructed from plastic, metal, or other material suitable for outdoor use) of substantially the same size as bed 106 in between storage bins 118 and 120 may be placed on top of spacer 502 in order to provide a flat surface upon which to store items. In order for the flat board to be level, it may be necessary to employ more than one of spacer 502 such that the flat board could rest evenly on multiple spacers 502.

It can be appreciated that multiple spacers 502 may be required to maintain the position of storage bins 118 and 120. The actual number of spacers used will depend on many factors, including, but not limited to, truck size, storage bin size, spacer strength and weight of items being stored within the storage bins.

Figure 6A:
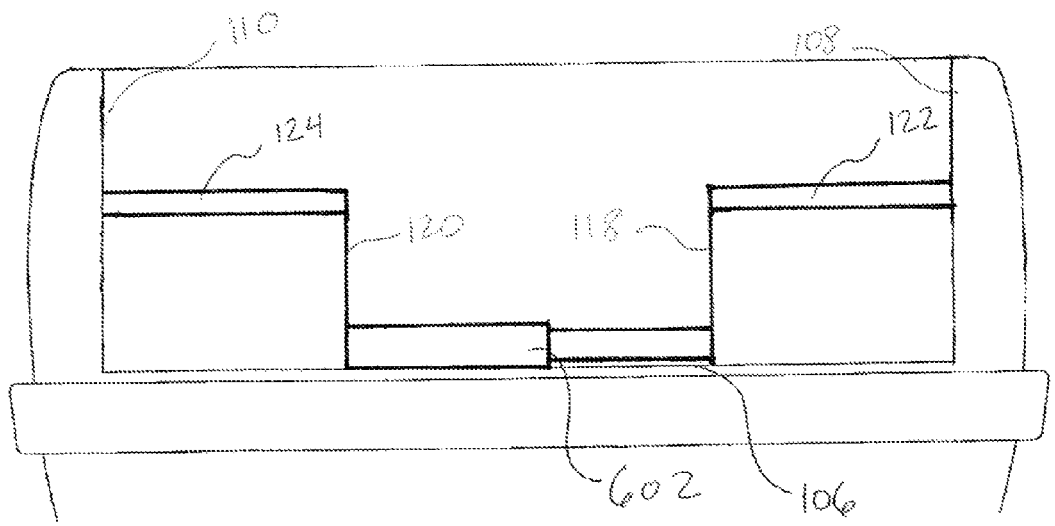
FIG. 6a is a rear view of the storage bins of FIG. 1 and a spacer according to a preferred embodiment of the present invention.

FIG. 6a is a rear view of the storage bins of FIG. 1 and a spacer according to a preferred embodiment of the present invention.

As shown in the figure, storage bins 118 and 120 are secured in place by spacer 602. Spacer 602 provides a constant pushing force that serves to constrain storage bins 118 and 120 against side walls 108 and 110, respectively.

Figure 6B:
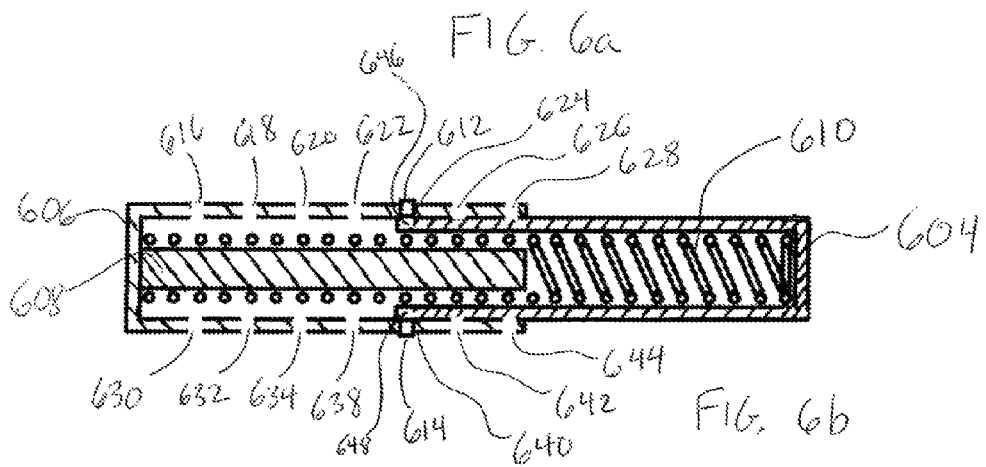
FIG. 6b is a cross section of the spacer of FIG. 6a in one configuration.

FIG. 6b is a cross section of the spacer of FIG. 6a in a first configuration.

As shown in the figure, spacer 602 includes inner tube 604, outer tube 606, spring post 608, spring 610, pins 612 and 614, slots 616-644 and recesses 646 and 648, with pin 612 located within slot 624 and recess 646, and pin 614 located within slot 640 and recess 648.

Inner tube 604, outer tube 606, spring post 608, spring 610 and pins 612 and 614 are preferably constructed from plastic or metal, but may be constructed from any material suitable for an outdoor environment.

Pins 612 and 614 may also be constructed from a resilient material; such that pins 612 and 614 can be compressed when put under a compressive load, and expand when the compressive load is removed. Pins 612 and 614 may also be constructed from multiple components that are spring-loaded, such that pins 612 and 614 can be compressed when put under a compressive load, and expand when the compressive load is removed.

Slots 616-644 are located on outer tube 606. Slots 616-628 are operable to receive pin 612, and slots 630-644 are operable to receive pin 614. Recesses 646 and 648 are located on inner tube 604. Recess 646 is operable to receive pin 612, and recess 648 is operable to receive pin 614.

Pins 612 and 614 are operable to selectively allow and prevent motion in between outer tube 606 and inner tube 604.

To assemble spacer 602, spring post 608 is attached to outer tube 606 by adhesive means (cyanoacrylate, 1-part epoxy, 2-part epoxy, hook-and-loop, etc.) or mechanical means (screws, bolts, rivets, nails, welding, brazing, etc.). Spring 610 is placed over spring post 608 until spring 610 contacts outer tube 606. Spring 610 may be bonded or connected to outer tube 606 by any means previously discussed, if desired. Inner tube 604 is placed over spring 610 until spring 610 contacts inner tube 604. Spring 610 may be bonded or connected to inner tube 604 by any means previously discussed, if desired. To insert pins 612 and 614, one of slots 616-628 and one of slots 630-644 must be aligned with recesses 646 and 648, respectively. Once proper alignment is achieved, pins 612 and 614 may be connected to recesses 646 and 648, respectively.

Figure 6C:
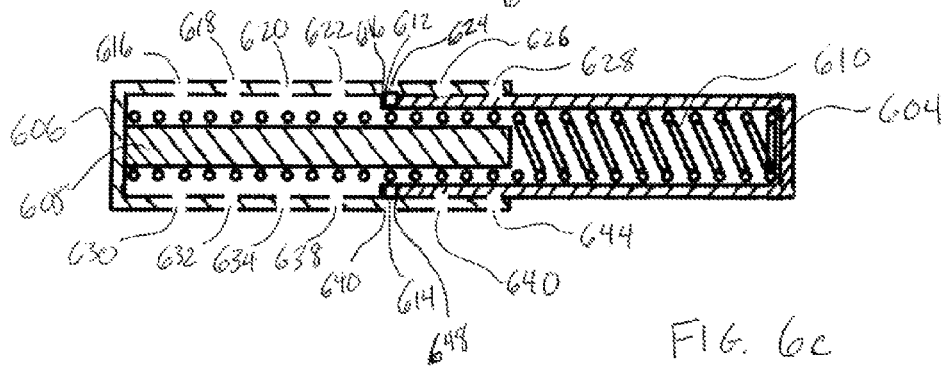
FIG. 6c is a cross section of the spacer of FIG. 6a in a second configuration.

FIG. 6c is a cross section of the spacer of FIG. 6b in a second configuration;

As shown in the figure, pin 612 has been compressed such that it only occupies recess 624, and pin 614 has been compressed such that it only occupies recess 648.

In operation, a user would be able to adjust the size of spacer 602 in order to best fit in the desired space. To do so, the user would compress pins 612 and 614, and then move outer tube 606 and inner tube 604 such that spacer 602 is either shortened or lengthened, depending on the final desired size. When the desired size is reached, the user releases pins 612 and 614 such that pins 612 and 614 expand and occupy both recesses 646 and 648, respectively, and one of slots 616-628 and 630-644, respectively. With pins 612 and 614 in this position, the size of spacer 602 is locked and cannot be changed unless pins 612 and 614 are compressed again.

Returning to FIG. 6a, the user would place storage bins 118 and 120 in the desired location against side walls 108 and 110, respectively. The user would then attempt to place spacer 602 in between storage bins 118 and 120. If spacer 602 does not fit, the user would shorten spacer 602 as described above such that it fits in between storage bins 118 and 120. The user would then lengthen spacer 602 until it contacts storage bins 118 and 120 and constrains storage bins 118 and 120 against side walls 108 and 110, respectively. Using spacer 602 would negate the need for other types of connectors that may require the user to modify the truck to receive the connectors.

Utilizing spacer 602 would create an uneven surface on bed 106 such that it may be difficult to store long, large or oddly shaped items on bed 106 when spacer 602 is utilized. To overcome this issue, a flat board (constructed from plastic, metal, or other material suitable for outdoor use) of substantially the same size as bed 106 in between storage bins 118 and 120 may be placed on top of spacer 602 in order to provide a flat surface upon which to store items. In order for the flat board to be level, it may be necessary to employ more than one of spacer 602 such that the flat board could rest evenly on multiple spacers 602.

It can be appreciated that multiple spacers 602 may be required to maintain the position of storage bins 118 and 120. The actual number of spacers used will depend on many factors, including, but not limited to, truck size, storage bin size, spacer strength and weight of items being stored within the storage bins.

Figure 7A:
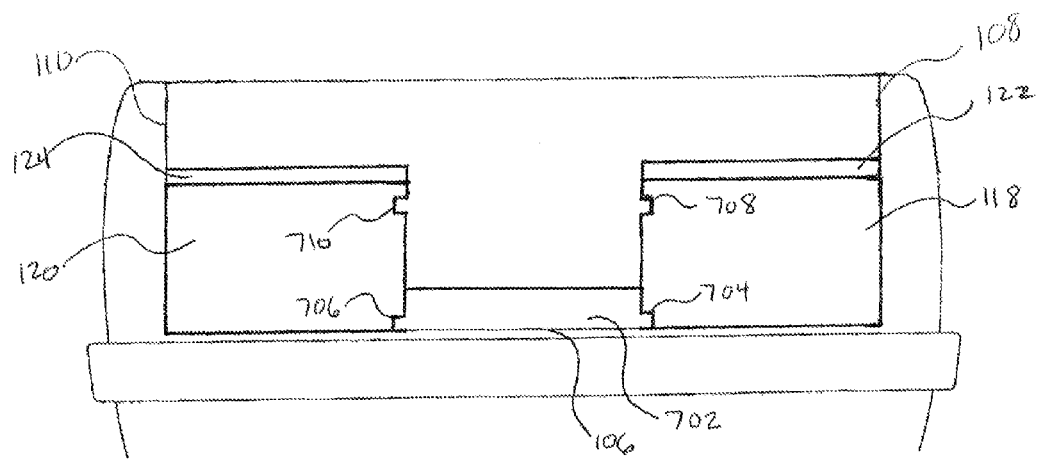
FIG. 7a is a rear view of the storage system of FIG. 1 with an integrated cover in a first configuration according to a preferred embodiment of the present invention.

FIG. 7a is a rear view of the storage system of FIG. 1 with an integrated cover in one configuration according to a preferred embodiment of the present invention.

As shown in the figure, storage bin 118 includes slots 704 and 708, and storage bin 120 includes slots 706 and 710. Slots 704-710 are sized to slidably receive removable cover 702, and removable cover 702 is in contact with bed 106.

Removable cover 702 is preferably constructed from plastic or metal, but may be constructed from any material suitable for storing items in an outdoor environment. In addition, it would be beneficial for removable cover 702 to be lightweight, as the user may occasionally be required to lift it. The length of removable cover 702 is equivalent to the lengths of storage bins 118 and 120.

In operation, a user will slide removable cover 702 into slots 704 and 706. In this configuration, a user has the ability to transport smaller items in storage bins 118 and 120 while maintaining the ability to store a long or oddly shaped item on top of removable cover 702 and within the open section in between storage bins 118 and 120.

Figure 7B:
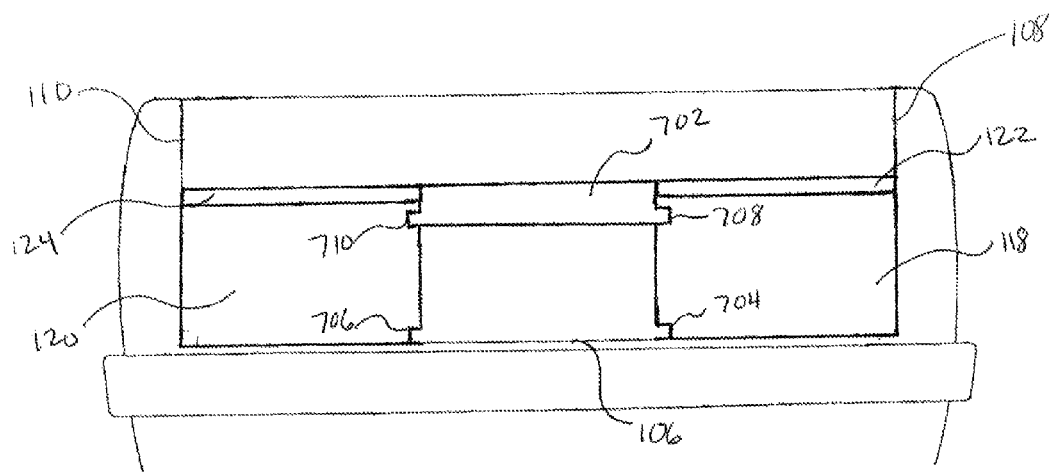
FIG. 7b is a rear view of the storage system of FIG. 1 with an integrated cover in a second configuration according to a preferred embodiment of the present invention.

FIG. 7b is a rear view of the storage system of FIG. 1 with an integrated cover in a second configuration according to a preferred embodiment of the present invention.

As shown in the figure, removable cover 702 is located within slots 708 and 710, and the he top surfaces of removable cover 702 and bin covers 122 and 124 are level with each other and provide a large, flat storage surface that is essentially the same size as the full width of bed 106 and full length of side walls 108 and 110.

In operation, when a user wants to move removable cover 702 from the lower position shown in FIG. 7a to the position shown in FIG. 7b, tailgate 104 (not shown) is opened, and the user can slide removable cover 702 out of slots 704 and 706. When removable cover 702 is free from slots 704 and 706, the user can then slide removable cover 702 within slots 708 and 710.

There may be several reasons a user would want removable cover 702 in the top configuration. First, the user may need to transport construction items like drywall or plywood, which are typically available in 4'×8' sizes. The combination of bin covers 122 and 124 along with the removable cover 702 creates a flat space on which large items such as drywall or plywood could be effectively stored. Second, the user may have one or more items that need to be stored securely, but cannot fit within storage bins 118 or 120. An example of an item that would fit that description would be skis or golf clubs. The user could slide the item on to bed 106 for storage. When tailgate 104 (not shown) is closed, the item stored on bed 106 cannot be accessed because it is completely enclosed on all four sides by bed 106, removable cover 702 and storage bins 118 and 120, and removable cover 702 can only be removed if tailgate 104 is opened.

In the configuration as shown, bin covers 122 and 124 may still be opened even when tailgate 104 (not shown) is closed. To prevent this situation, it may also be beneficial to incorporate additional slots on storage bins 118 and 120 and slots on bin covers 122 and 124, along with corresponding geometry on removable cover 702 to mate with the slots, such that when removable cover 702 is in the top configuration, it engages both storage bins 118 and 120 and bin covers 122 and 124. Then, when removable cover 702 is in the top configuration with tailgate 104 (not shown) closed, removable cover 702 cannot be removed, and neither bin cover 122 or 124 can be opened, providing a totally secure system for the items stored within storage bins 118 and 120 and on bed 106 underneath removable cover 702.

In addition, it may be beneficial to incorporate even more additional slots on storage bins 118 and 120 in order to accommodate another flat surface to be inserted underneath removable cover 702. The flat surface would provide a force to maintain the position of storage bins 118 and 120 such that bins 118 and 120 were secure, similar in function to spacers 502 and 602 discussed previously with reference to FIGS. 5-6. Removable cover 702 could be stored above the flat surface in the stowed configuration and operate in the same way described above in moving from the stowed configuration to the deployed configuration.

Figure 8A:
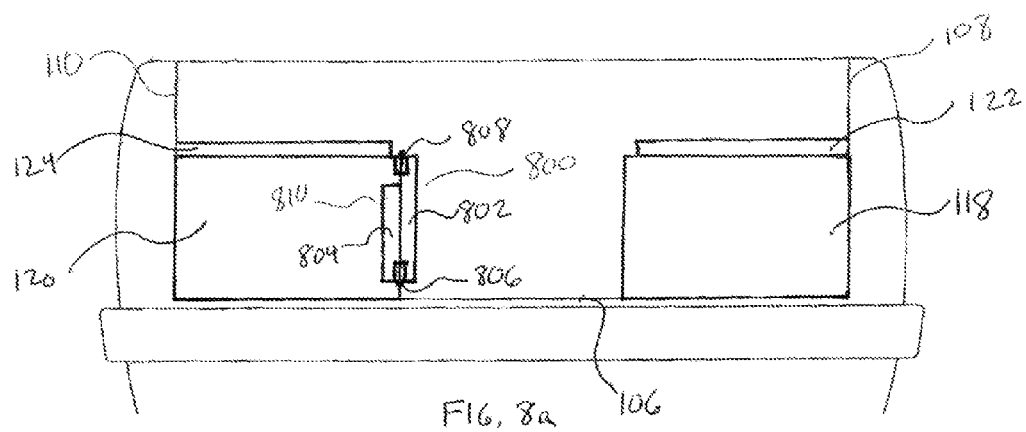
FIG. 8a is a rear view of the storage system of FIG. 1 with an integrated cover in a first configuration according to another preferred embodiment of the present invention.

FIG. 8a is a rear view of the storage system of FIG. 1 with an integrated cover in one configuration according to another preferred embodiment of the present invention.

As shown in the figure, removable cover 800 includes first member 802, second member 804, hinges 806 and 808, and recess 810.

First member 802, second member 804 and hinges 806 and 808 are preferably constructed from plastic or metal, but may be constructed from any material suitable for an outdoor environment.

Recess 810 is operable to support removable cover 800 in a folded or stowed configuration. Recess 810 may be on the outside of storage bin 120, as shown in the figure, however it may also be located on the inside of storage bin 120, such that bin cover 124 would need to be opened prior to moving removable cover 800 from a stowed configuration to a deployed configuration.

Storage bins 118 and 120 are slightly wider than bin covers 122 and 124 in order to provide a space on which removable cover 800 can rest in the deployed configuration. The difference in width does not affect the ability of bin covers 122 and 124 to protect items stored in storage bins 118 and 120, and any gaskets utilized in between bin covers 122 and 124 and storage bins 118 and 120 will still provide a watertight seal.

Figure 8B:
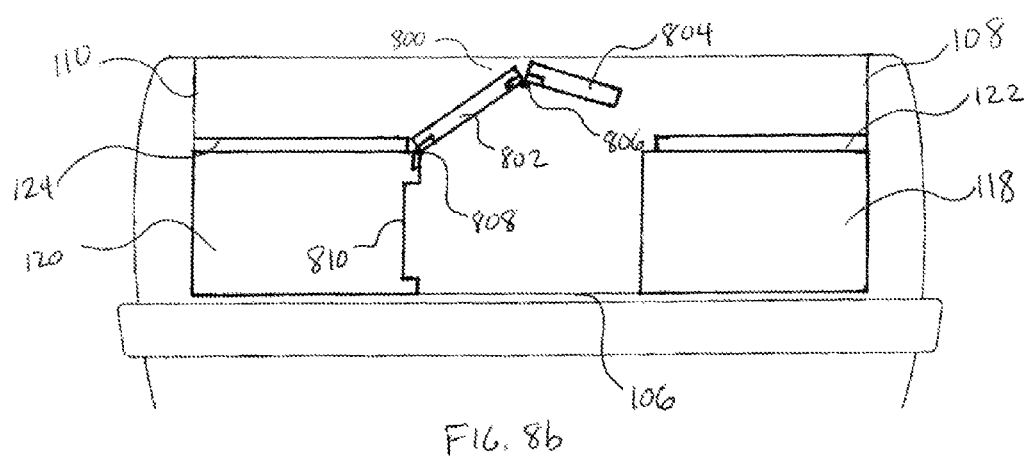
FIG. 8b is a rear view of the storage system of FIG. 1 with an integrated cover in a second configuration according to a preferred embodiment of the present invention.

FIG. 8b is a rear view of the storage system of FIG. 1 with an integrated cover in a second configuration according to a preferred embodiment of the present invention.

As shown in the figure, removable cover 800 is transitioning from a stowed state to a deployed state. The transition is initiated by rotating first member 802 around hinge 808 until hinge 806 is higher than bin covers 122 and 124. Having removable cover 800 in this position during the transition from the stowed state to the deployed state will ensure second member 804 can be rotated into position without interference from storage bin 118. When hinge 806 is higher than bin covers 122 and 124, second member 804 can be rotated away from first member 802. Second member 804 may be rotated until it contacts first member 802. When first member 802 and second member 804 are in contact with each other, removable cover 800 looks as though it is a single, flat member.

It can be appreciated that the number of hinges and movable members is subject to various considerations such as the height of storage bins 118 and 120 or the width of the space in between storage bins 118 and 120. Taking these considerations into account may prompt the designer to utilize more hinges and movable members, or just a single member with a single hinge.

Figure 8C:
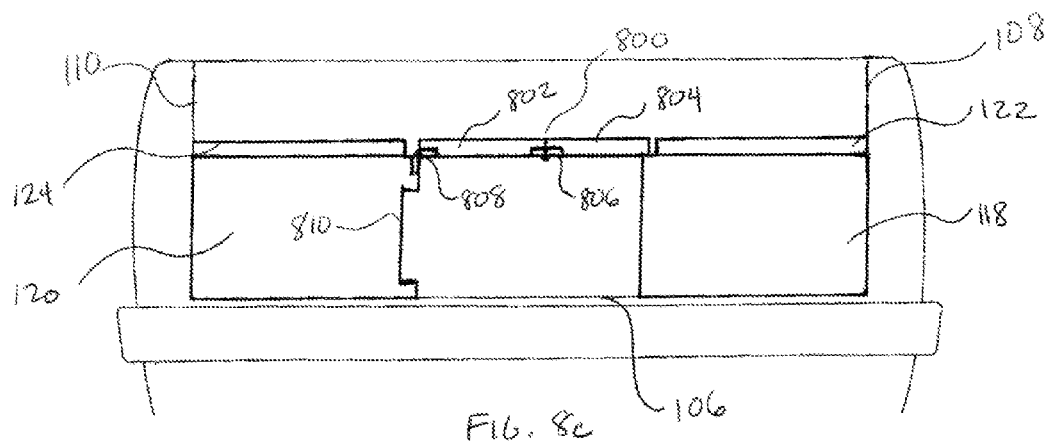
FIG. 8c is a rear view of the storage system of FIG. 1 with an integrated cover in a third configuration according to a preferred embodiment of the present invention.

FIG. 8c is a rear view of the storage system of FIG. 1 with an integrated cover in a third configuration according to a preferred embodiment of the present invention.

As shown in the figure, removable cover 800 is in the deployed configuration. Second member 804 is resting on top of storage bin 118, which supports removable cover 800 when items are stored on top of it. The top surfaces of first member 802, second member 804 and bin covers 122 and 124 are level with each other and provide a large, flat storage surface that is essentially the same size as the full width of bed 106 and full length of side walls 108 and 110.

There may be several reasons a user would want removable cover 800 in the deployed configuration. First, the user may need to transport construction items like drywall or plywood, which are typically available in 4'×8' sizes. The combination of bin covers 122 and 124 along with removable cover 800 creates a flat space on which large items such as drywall or plywood could be effectively stored. Second, the user may have one or more items that need to be stored securely, but cannot fit within storage bins 118 or 120. An example of items that would fit that description would be skis or golf clubs. The user could slide the item on to bed 106 for storage. When tailgate 104 not shown) is closed, the item stored on bed 106 cannot be accessed because it is completely enclosed on all four sides by bed 106, removable cover 800 and storage bins 118 and 120. For additional security, removable cover may be locked to storage bin 118 to prevent theft. A locking mechanism will be further described with reference to FIGS. 12a-c.

FIG. 9a is a rear view of the storage system of FIG. 1 with an integrated cover in one configuration according to another preferred embodiment of the present invention.

As shown in the figure, removable cover 906 includes post 904 and slot 902. Removable cover 906 and post 904 are preferably constructed from plastic or metal, but may be constructed from any material suitable for an outdoor environment. Slot 902 is within the wall of storage bin 120. Depending on the material of storage bin 120, slot 902 may be created via a molding or machining process.

Post 904 is attached to removable cover 906 by mechanical fasteners, adhesive fasteners, or any other fastening method that would be suitable for the application. In addition, post 904 may be integrated into removable cover 906 such that it is a single piece of material.

Post 904 is operable to slide within slot 902, such that removable cover 906 can be transitioned from a stowed state, as shown in FIG. 9a, to a deployed state.

Storage bins 118 and 120 are slightly wider than bin covers 122 and 124 in order to provide a space on which removable cover 906 can rest in the deployed configuration. The difference in width does not affect the ability of bin covers 122 and 124 to protect items stored in storage bins 118 and 120, and any gaskets utilized in between bin covers 122 and 124 and storage bins 118 and 120 will still provide a watertight seal.

FIG. 9b is a rear view of the storage system of FIG. 1 with an integrated cover in a second configuration according to a preferred embodiment of the present invention.

As shown in the figure, removable cover 906 is transitioning from a stowed state to a deployed state. To initiate the transition, the user would pull upward on removable cover 906, such that post 904 slides within slot 902 until post 904 contacts the top end of slot 902. When post 904 contacts the top end of slot 902, removable cover 906 can no longer be pulled upward. The user would then begin to rotate removable cover 906 toward storage bin 118. Rotating removable cover 906 would cause post 904 to rotate within slot 902.

FIG. 9c is a rear view of the storage system of FIG. 1 with an integrated cover in a third configuration according to another preferred embodiment of the present invention.

As shown in the figure, removable cover 906 is in the deployed configuration. Removable cover 906 is resting on top of storage bin 118, which supports removable cover 906 when items are stored on top of it. The top surfaces of removable cover 906 and bin covers 122 and 124 are level with each other and provide a large, flat storage surface that is essentially the same size as the full width of bed 106 and full length of side walls 108 and 110.

There may be several reasons a user would want removable cover 906 in the deployed configuration. First, the user may need to transport construction items like drywall or plywood, which are typically available in 4'×8' sizes. The combination of bin covers 122 and 124 along with removable cover 906 creates a flat space on which large items such as drywall or plywood could be effectively stored. Second, the user may have one or more items that need to be stored securely, but cannot fit within storage bins 118 or 120. An example of items that would fit that description would be skis or golf clubs. The user could slide the item on to bed 106 for storage. When tailgate 104 (not shown) is closed, the item stored on bed 106 cannot be accessed because it is completely enclosed on all four sides by bed 106, removable cover 906 and storage bins 118 and 120. For additional security, removable cover 906 may be locked to storage bin 118 to prevent theft. A locking mechanism will be further described with reference to FIG. 12.

Figure 10A:
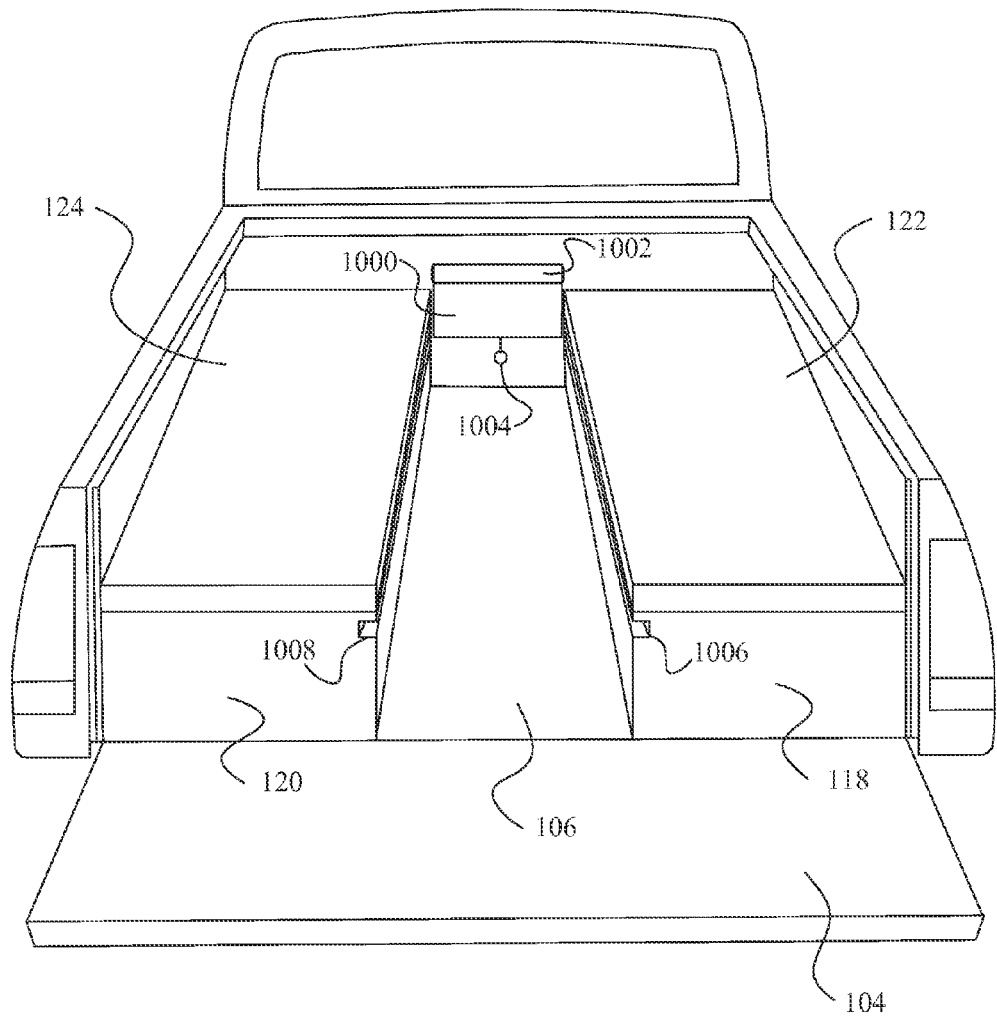
FIG. 10a is a rear view of the storage system of FIG. 1 with an integrated cover in a first configuration according to another preferred embodiment of the present invention.

FIG. 10a is a rear view of the storage system of FIG. 1 with an integrated cover in one configuration according to another preferred embodiment of the present invention.

As shown in the figure, removable cover 1000 includes roller 1002 and cover pull 1004. Storage bins 118 and 120 include slots 1006 and 1008, respectively.

Removable cover 1000 is preferably constructed from a flexible, waterproof material that is suitable for use in an outdoor environment. In addition, removable cover 1000 is preferably constructed from a puncture or cut-resistant material to aid in theft prevention.

Roller 1002 can be similar to rollers used with indoor window shades; however it should be constructed of materials suitable for use in an outdoor environment. Roller 1002 can be spring loaded, such that pulling removable cover 1000 a short distance away from roller 1002 and then releasing removable cover 1000 would cause roller 1002 to pull removable cover 1000 toward roller 1002. Roller 1002 may also be non-spring loaded; such that the user is required to pull a cord until removable cover 1000 is either fully deployed or fully retracted.

Cover pull 1004 can be similar to cover pulls used with indoor window shades; however it should be constructed of materials suitable for use in an outdoor environment. If using a spring loaded roller 1002, cover pull 1004 may be short or long, depending on the preferences of the user. If using a non-spring loaded roller 1002, cover pull 1004 would extend from roller 1002 to the end of bed 106, and a pulley would need to be employed such that the user could pull cover pull 1004 in one direction to deploy removable cover 1002 and pull cover pull 1004 in the other direction to retract removable cover 1002.

Figure 10B:
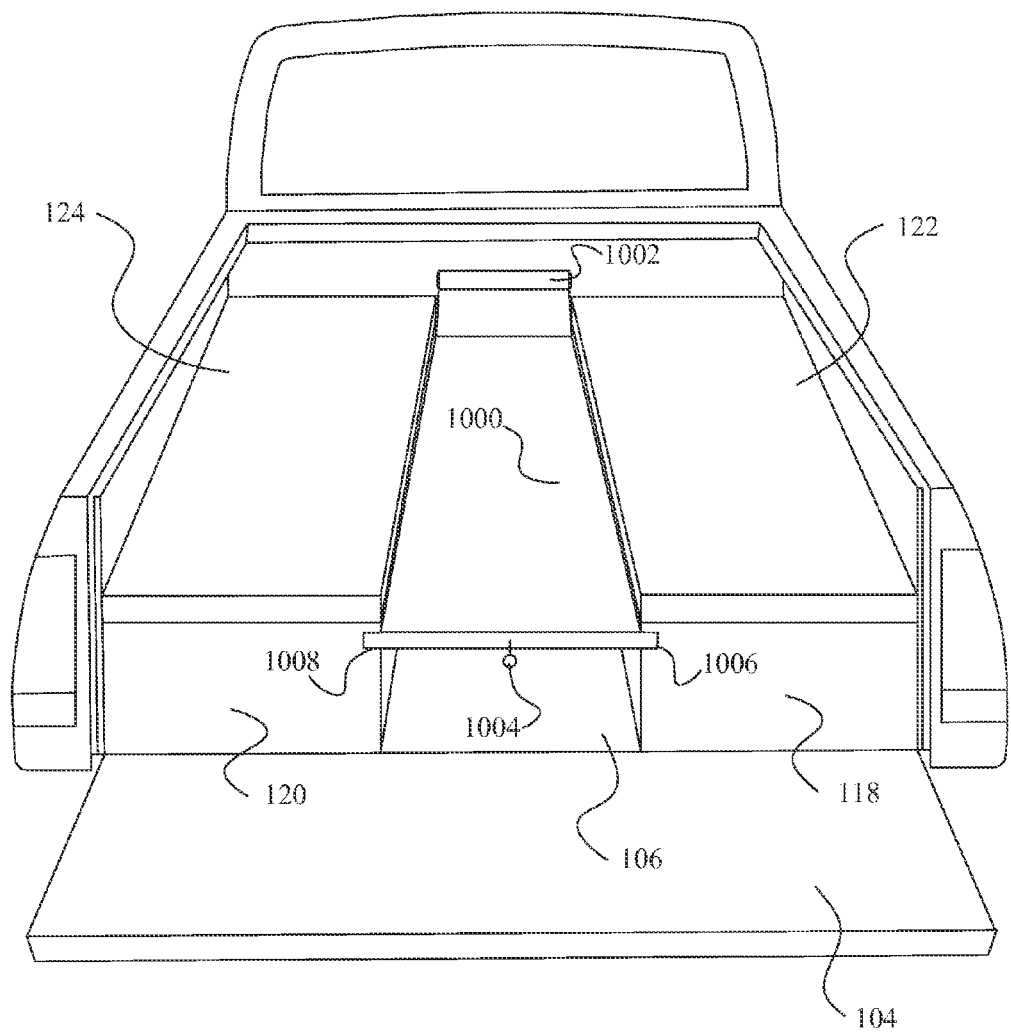
FIG. 10b is a rear view of the storage system of FIG. 1 with an integrated cover in a second configuration according to a preferred embodiment of the present invention.

FIG. 10b is a rear view of the storage system of FIG. 1 with an integrated cover in a second configuration according to a preferred embodiment of the present invention.

As shown in the figure, removable cover 1000 is in the deployed position. To transition removable cover 1000 from the stowed position to the deployed position, the user would pull on cover pull 1004 toward tailgate 104 until removable cover 1000 reached the ends of slots 1006 and 1008. If desired, the user may prefer to pull removable cover 1000 only part of the way, leaving a section of bed 106 covered, and another section of bed 106 uncovered.

The user may want removable cover 1000 in the deployed configuration because the user may have one or more items that need to be stored securely, but cannot fit within storage bins 118 or 120. An example of items that would fit that description would be skis or golf clubs. The user could slide the item on to bed 106 for storage. When tailgate 104 (not shown) is closed and removable cover 1000 is fully deployed, the item stored on bed 106 cannot be accessed because it is completely enclosed on all four sides by bed 106, removable cover 1000 and storage bins 118 and 120. Removable cover would not need to be locked to storage bins 118 or 120 because cover pull 1004 could only be accessed when tailgate 104 is opened.

Figure 11A:
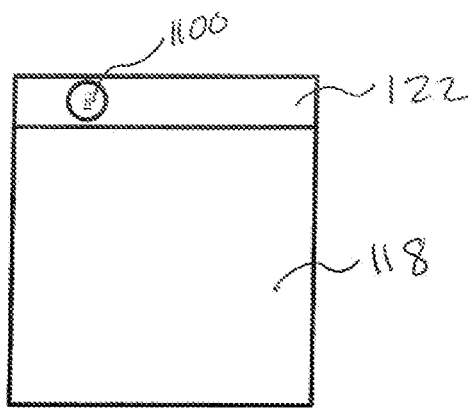
FIG. 11a is a rear view of a storage bin of FIG. 1 with a locking mechanism according to another preferred embodiment of the present invention.

FIG. 11a is a rear view of a storage bin of FIG. 1 with a locking mechanism according to another preferred embodiment of the present invention.

As shown in the figure, bin cover 122 includes keyhole assembly 1100. Keyhole assembly 1100 may be any conventional assembly, though preferably it would be designed to withstand an outdoor environment.

Keyhole assembly 1100 is operable to receive a key that is designed to engage keyhole assembly 1100 such that when the key is turned within keyhole assembly 1100, bin cover 122 and storage bin 118 may be locked together such that the contents of storage bin 118 cannot be accessed unless the key is turned in the opposite direction within keyhole assembly 1100.

Figure 11B:
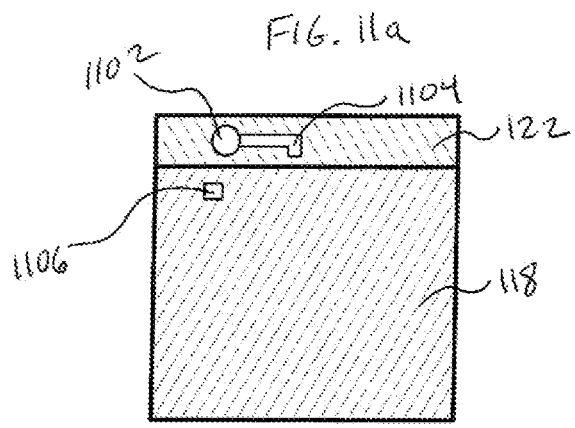
FIG. 11b is a cross section of the rear view of a storage bin of FIG. 1 with a locking mechanism in the unlocked configuration.

FIG. 11b is a cross section of the rear view of a storage bin of FIG. 1 with a locking mechanism in the unlocked configuration.

As shown in the figure, bin cover 122 includes cylinder 1102 and latch 1104. Storage bin 118 includes post 1106.

Cylinder 1102 and latch 1104 are joined together. They may be joined by mechanical fasteners, adhesive fasteners, or cylinder 1102 and latch 1104 may be manufactured out of a single piece of material such that joining the two parts together is unnecessary. Cylinder 1102 and latch 1104 may be made of any material suitable to withstand a theft attempt.

Post 1106 is joined to storage bin 118, and may be joined by mechanical fasteners, adhesive fasteners, or post 1106 may be an integral part of storage bin 118 such that storage bin 118 and post 1106 are manufactured from a single piece of material.

In the configuration shown, bin cover 122 and storage bin 118 are not locked together. A user could freely open bin cover 122 in the unlocked configuration in order to retrieve items from, or place items into, storage bin 118.

Figure 11C:
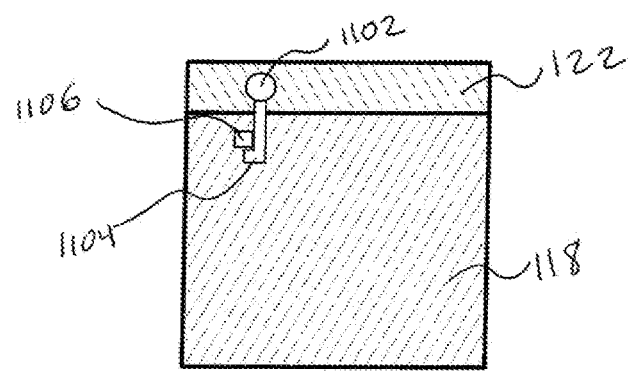
FIG. 11c is a cross section of the rear view of a storage bin of FIG. 1 with a locking mechanism in the locked configuration.

FIG. 11c is a cross section of the rear view of a storage bin of FIG. 1 with a locking mechanism in the locked configuration.

As shown in the figure, the assembly of cylinder 1102 and latch 1104 has been rotated such that latch 1104 has engaged post 1106. Cylinder 1102 and latch 1104 can be moved to this configuration by inserting a key into keyhole assembly 1100 from FIG. 11a and rotating the key. Rotating the key will rotate cylinder 1102 and latch 1104 until latch 1104 engages post 1106.

In the configuration shown, bin cover 122 and storage bin 118 are locked together. A user would not be able to open bin cover 122 to retrieve items from, or place items into, storage bin 118 without inserting a key into keyhole assembly 1100 of FIG. 11a and turning the key in the opposite direction of that used to lock bin cover 122 to storage bin 118.

Figure 12A:
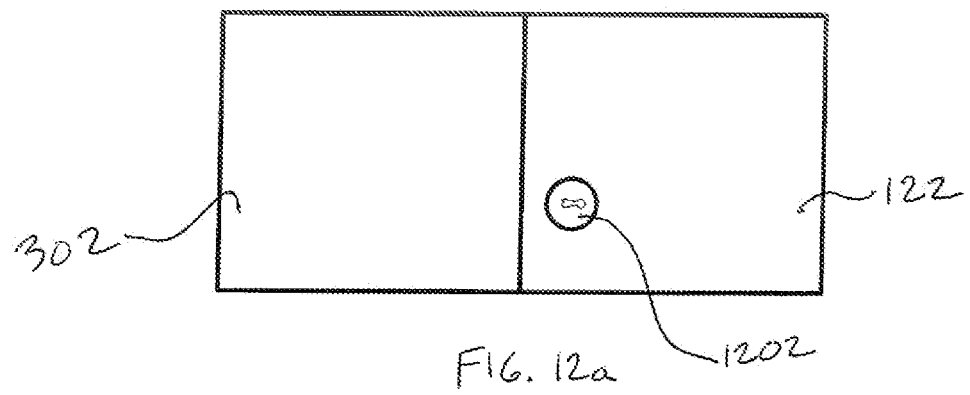
FIG. 12a is a top view of the integrated cover and a storage bin of FIG. 1 with a locking mechanism according to another preferred embodiment of the present invention.

FIG. 12a is a top view of the integrated cover and a storage bin of FIG. 1 with a locking mechanism according to another preferred embodiment of the present invention.

As shown in the figure, bin cover 122 includes keyhole assembly 1202. Keyhole assembly 1202 may be any conventional assembly, though preferably it would be designed to withstand an outdoor environment.

Keyhole assembly 1202 is operable to receive a key that is designed to engage keyhole assembly 1202 such that when the key is turned within keyhole assembly 1202, bin cover 122 and removable cover 302 may be locked together such that the contents protected by removable cover 302 cannot be accessed unless the key is turned in the opposite direction within keyhole assembly 1202.

Removable cover 302 may include any of the different types of removable covers described in FIGS. 7-10.

Figure 12B:
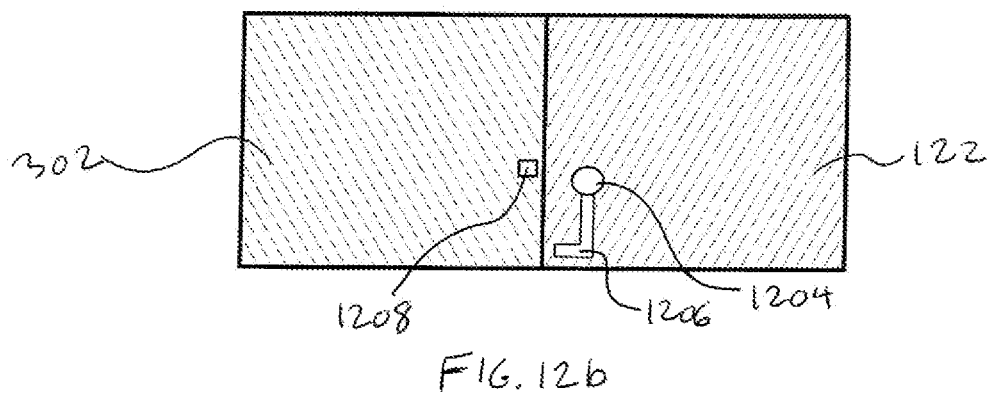
FIG. 12b is a cross section of the top view of the integrated cover and a storage bin of FIG. 1 with a locking mechanism in the unlocked configuration.

FIG. 12b is a cross section of the top view of the integrated cover and a storage bin of FIG. 1 with a locking mechanism in the unlocked configuration.

As shown in the figure, bin cover 122 includes cylinder 1204 and latch 1206. Removable cover 302 includes post 1208.

Cylinder 1204 and latch 1206 are joined together. They may be joined by mechanical fasteners, adhesive fasteners, or cylinder 1204 and latch 1206 may be manufactured out of a single piece of material such that joining the two parts together is unnecessary. Cylinder 1204 and latch 1206 may be made of any material suitable to withstand a theft attempt.

Post 1208 is joined to removable cover 302, and may be joined by mechanical fasteners, adhesive fasteners, or post 1208 may be an integral part of removable cover 302 such that removable cover 302 and post 1208 are manufactured from a single piece of material.

In the configuration shown, bin cover 122 and removable cover 302 are not locked together. A user could freely remove removable cover 302 in the unlocked configuration in order to retrieve items from, or place items onto, bed 106 (not shown).

Figure 12C:
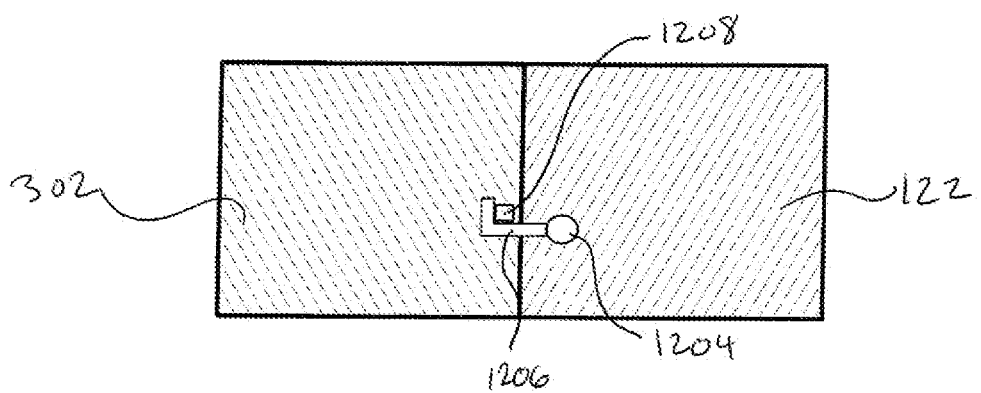
FIG. 12c is a cross section of the top view of the integrated cover and a storage bin of FIG. 1 with a locking mechanism in the locked configuration.

FIG. 12c is a cross section of the top view of the integrated cover and a storage bin of FIG. 1 with a locking mechanism in the locked configuration.

As shown in the figure, the assembly of cylinder 1204 and latch 1206 has been rotated such that latch 1206 has engaged post 1208. Cylinder 1204 and latch 1206 can be moved to this configuration by inserting a key into keyhole assembly 1202 from FIG. 12a and rotating the key. Rotating the key will rotate cylinder 1204 and latch 1206 until latch 1206 engages post 1208. In the configuration shown, bin cover 122 and removable cover 302 are locked together. A user would not be able to remove removable cover 302 to retrieve items from, or place items onto, bed 106 (not shown) without inserting a key into keyhole assembly 1202 of FIG. 12a and turning the key in the opposite direction of that used to lock bin cover 122 to removable cover 302.

Figure 13:
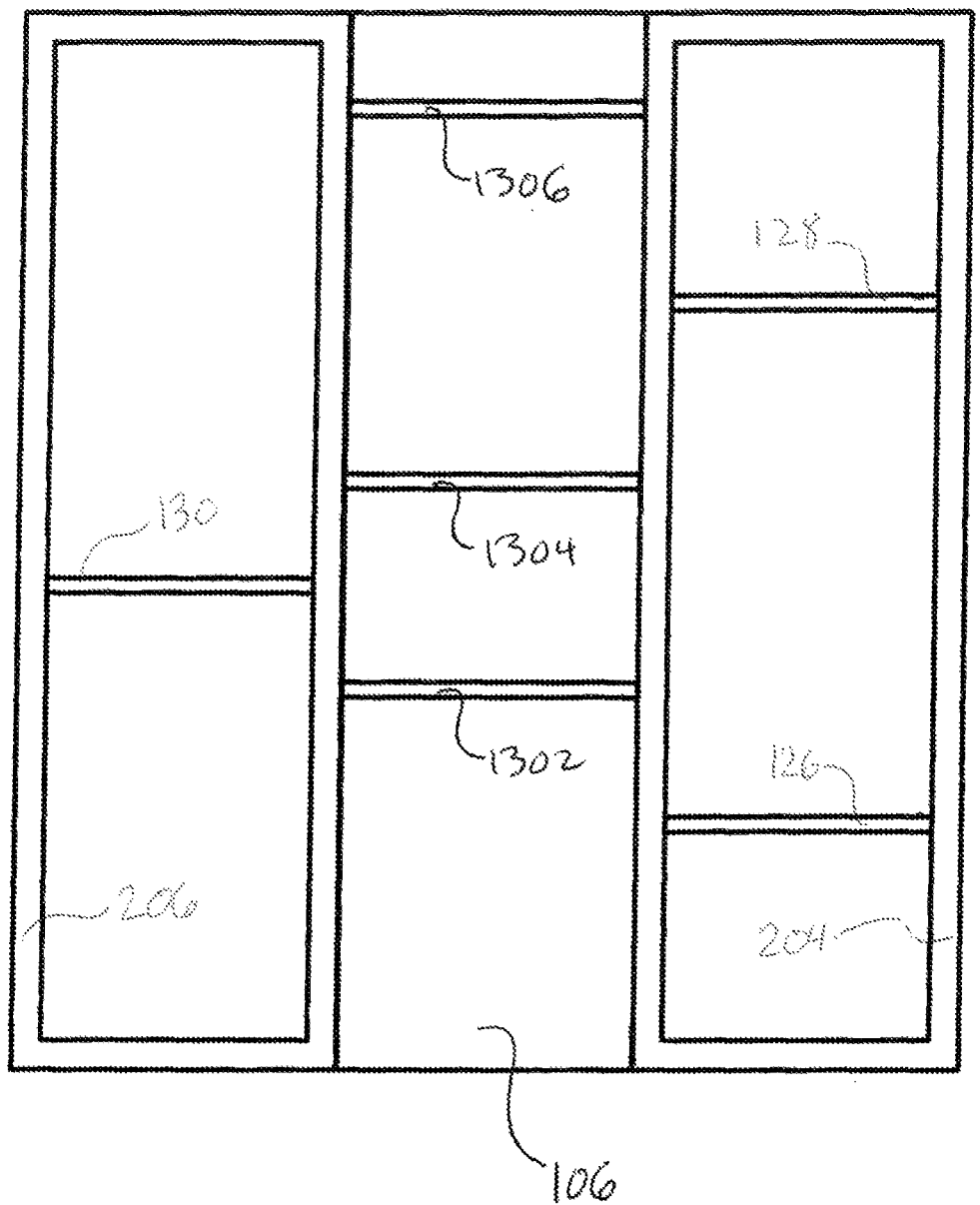
FIG. 13 is a top view of the storage bins of FIG. 2 with dividers and an open section with dividers according to another preferred embodiment of the present invention.

FIG. 13 is a top view of the storage bins of FIG. 2 with dividers and an open section with dividers according to another preferred embodiment of the present invention.

As shown in the figure, storage bin 206 includes divider 130, and storage bin 204 includes dividers 126 and 128. Bed 106 includes dividers 1302-1306.

Dividers 126-130 and 1302-1306 may be substantially similar to spacers 502 and 602 in design, materials, assembly and operation, and they are operable to provide a user the ability to subdivide the open section in between bins 204 and 206 and the space within storage bins 204 and 206 in order to better match the size of the items being stored. Dividers 126-130 and 1302-1306 are removable, such that the user may remove them from storage bins 204 and 206 or from the open section in between storage bins 204 and 206 in order to create a larger space for long or oddly shaped items. When the larger space is not required, dividers 126-130 and 1302-1306 may be put back in any arrangement desired by the user. In addition, dividers 126-130 and 1302-1306 are interchangeable with each other, such that any of the dividers may be used within storage bins 204 or 206, or the open section in between storage bins 204 and 206. Additionally, there may be more or fewer dividers than have been described above. The above description would apply to the use of any number of dividers.

Figure 14:
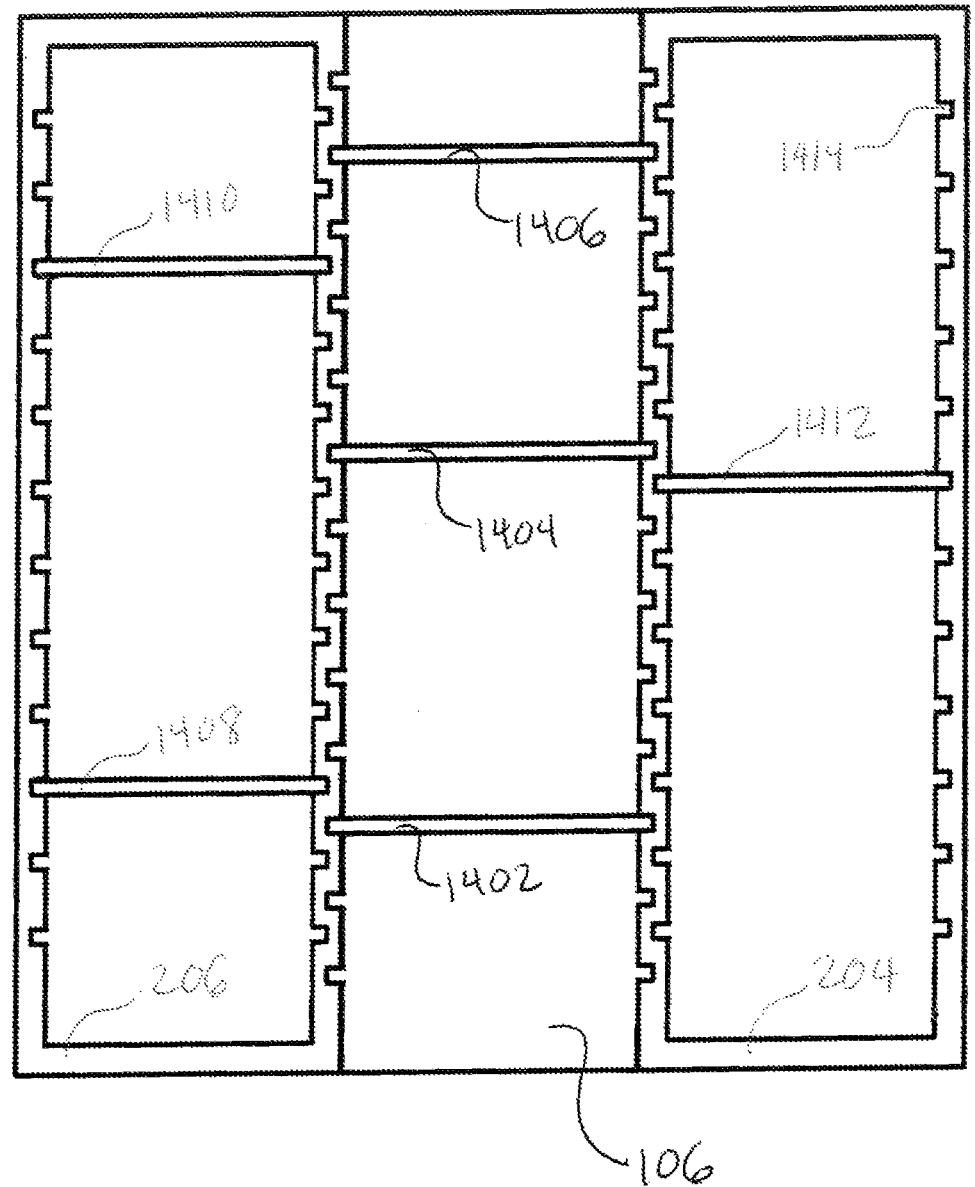
FIG. 14 is a top view of the storage bins of FIG. 2 with dividers and an open section with dividers according to another preferred embodiment of the present invention.

FIG. 14 is a top view of the storage bins of FIG. 2 with dividers and an open section with dividers according to another preferred embodiment of the present invention.

As shown in the figure, storage bin 206 includes dividers 1408 and 1410, and storage bin 204 includes divider 1412. Bed 106 includes dividers 1402-1406. Storage bins 204 and 206 and bed 106 include notches 1414.

Dividers 1402-1412 are preferably constructed from plastic or metal, but may be constructed from any material suitable for an outdoor environment. Dividers 1402-1412 are operable to slide within notches 1414. Dividers 1402-1412 are constructed from a single piece of material and contain no moving parts.

Notches 1414 are operable to slidably receive dividers 1402-1412, and, as shown, are of a square shape. Notches 1414 may be any shape that matches the shape of dividers 1402-1412.

In operation, a user would have a set of items for storage, and the user would arrange dividers 1402-1414 in the manner that best suits the items to be stored. For example, it may be beneficial to arrange all of dividers 1402-1414 in storage bin 204 such that no dividers are within storage bin 206 or the open section between storage bins 204 and 206. The user may also choose not to use any dividers to provide further organization. Additionally, there may be more or fewer dividers than have been described above. The above description would apply to the use of any number of dividers.

Figure 15A:
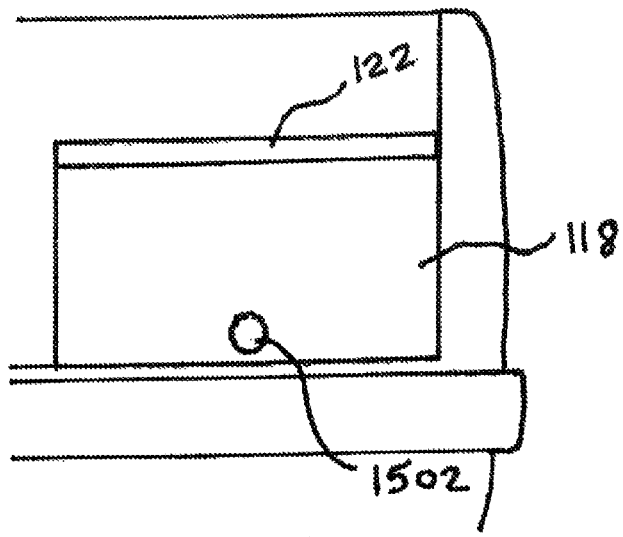
FIG. 15a is a rear view of a storage bin of FIG. 1 with a drain hole according to a preferred embodiment of the present invention.

FIG. 15a is a rear view of a storage bin of FIG. 1 with a drain hole according to a preferred embodiment of the present invention.

As shown in the figure, storage bin 118 includes drain hole 1502. Drain hole 1502 is located at or near the bottom surface of storage bin 118. With drain hole 1502 in that location, any liquid that enters storage bin 118 or spills from an item located within storage bin 118 will exit via drain hole 1502. To provide a pathway for drainage, the bottom surface of storage bin 118 may be angled toward tailgate 104 (not shown), such that any liquid will flow toward drain hole 1502. Drain hole 1502 may be of any size or shape suitable for the typical weather conditions or the types of materials being stored or transported. In addition, more than one drain hole may be employed depending on the typical weather conditions or the types of materials being stored or transported. Drain hole 1502 may also include a drain plug to substantially fill drain hole 1502 to prevent fluid from exiting drain hole 1502 if desired by the user.

Figure 15B:
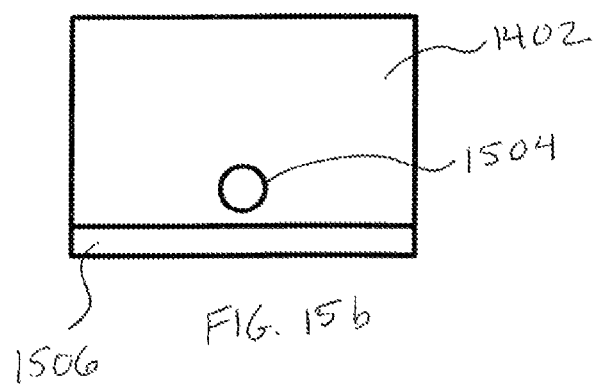
FIG. 15b is a divider of FIG. 14 according to a preferred embodiment of the present invention.

FIG. 15b is a divider of FIG. 14 according to a preferred embodiment of the present invention.

As shown in the figure, divider 1402 includes drain hole 1504 and gasket 1506. Drain hole 1504 is located at or near the bottom surface of divider 1402, and is located adjacent to gasket 1506. Drain hole 1504 may also include a drain plug to substantially fill drain hole 1504 to prevent fluid from exiting drain hole 1504 if desired by the user.

Gasket 1506 is made from any material suitable for outdoor use that can create an effective, watertight seal. Some examples of suitable materials include rubber and silicone.

In operation, divider 1402 would be placed in storage bin 118 from FIG. 15a to create a smaller space within storage bin 118. In addition, multiple dividers 1402 may be used to create many smaller spaces within storage bin 118. Gasket 1506 would contact the bottom surface of storage bin 118 to create a watertight seal against the bottom surface of storage bin 118. In combination with utilizing a drain plug to plug drain hole 1504, a watertight space may be created. This may be beneficial if there is an unintended spill of fluid in one space, such that the spill is contained and does not impact items stored in other spaces. It also may be beneficial if fluid or ice is intentionally placed in a space (to create a makeshift cooler, for instance). When the user wishes to drain the fluid from the space, either the drain plug is pulled, allowing fluid to escape through drain 1504, or divider 1402 is lifted, breaking the seal between gasket 1506 and the bottom surface of storage bin 118, and allowing fluid to flow beneath gasket 1506.

Figure 15C:
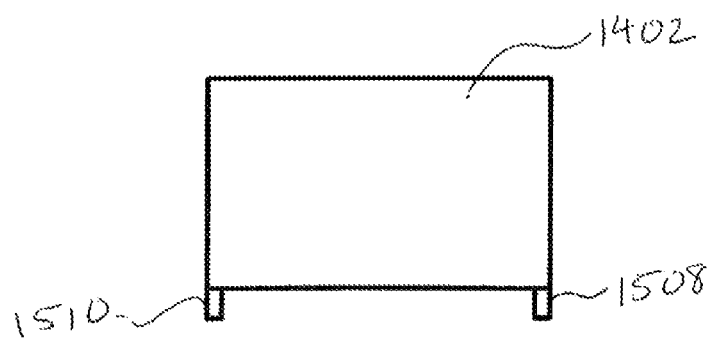
FIG. 15c is a divider of FIG. 14 according to a preferred embodiment of the present invention.

FIG. 15c is a divider of FIG. 14 according to a preferred embodiment of the present invention.

As shown in the figure, divider 1402 includes feet 1508 and 1510. Feet 1508 and 1510 may be constructed from the same material as divider 1402, but they may also be constructed from other materials, as long as the materials selected are suitable for use in an outdoor environment. Feet 1508 and 1510 may be integral to divider 1402 such that divider 1402 and feet 1508 and 1510 are a single component. Feet 1508 and 1510 may also be separate from divider 1402 such that they must be connected by either mechanical fasteners or adhesive fasteners.

In operation, divider 1402 would be placed in storage bin 118 from FIG. 15a to create a smaller space within storage bin 118. Feet 1508 and 1510 would contact the bottom surface of storage bin 118 leaving a space between the bottom surface of storage bin 118 and the bottom surface of divider 1402. Any fluid that is unintentionally spilled within storage bin 118 will be able to flow in the space between the bottom surface of storage bin 118 and the bottom surface of divider 1402 such that it may exit storage bin 118 via drain hole 1502 from FIG. 15a.

Figure 16:
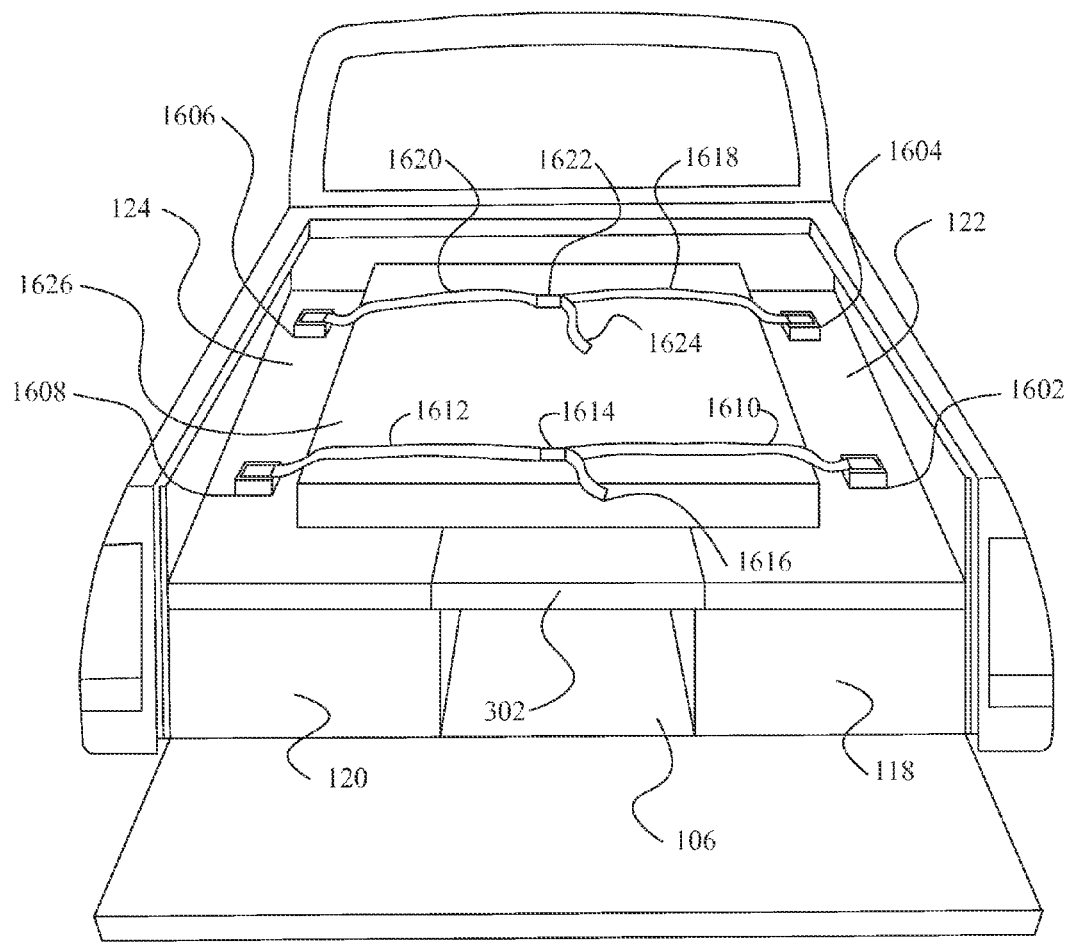
FIG. 16 is a perspective view of the storage system of FIG. 1 with means to secure items on top of the system according to another preferred embodiment of the present invention.

FIG. 16 is a perspective view of the storage system of FIG. 1 with means to secure items on top of the system according to another preferred embodiment of the present invention.

As shown in the figure, item 1626 is stored on top of the flat surface provided by bin covers 122 and 124 and removable cover 302. Item 1626 is secured by straps 1610, 1612, 1618, and 1620. Straps 1610 and 1612 are connected by connector 1614 and tightened by pulling on strap 1616. Straps 1618 and 1620 are connected by connector 1622 and tightened by pulling on strap 1624. Mounting blocks 1602-1608 provide a surface to which straps 1610, 1612, 1618, and 1620 are connected. Mounting blocks 1602-1608 are attached to bin covers 122 and 124.

Item 1626 is representative of a large, flat item that needs to be transported. Item 1626 may include sheets of drywall, plywood, concrete board, or any other large, flat material that may need to be transported.

Straps 1610, 1612, 1616, 1618, 1620, and 1624 are preferably constructed from a material that can withstand an outdoor environment and heavy duty loads. Example materials include nylon, canvas, or high strength composite materials.

Connectors 1614 and 1622 can be any standard type of connection means that provides a secure connection and the ability to adjust the length of the straps to which it is connected. A preferred connection mechanism is one in which the straps may be connected by pushing two parts of the connector together to provide a secure connection, and then be released when desired by squeezing a specified portion of the connector.

Strap 1616 may be a part of one of straps 1610 or 1612, depending on how straps 1610 and 1612 are connected to connector 1614. For purposes of explanation, in this example strap 1616 is a part of strap 1612. Strap 1624 may be a part of one of straps 1618 or 1620, depending on how straps 1618 and 1620 are connected to connector 1622. For purposes of explanation, in this example strap 1624 is a part of strap 1620.

Mounting blocks 1602-1608 are preferably constructed from plastic or metal, but may be constructed from any material suitable for an outdoor environment. Mounting blocks 1602-1608 are attached to bin covers 122 and 124 via mechanical fasteners, adhesive fasteners, or any other method by which mounting blocks 1602-1608 may be securely attached to bin covers 122 and 124. Strap 1612 is attached to mounting block 1608, strap 1610 is attached to mounting block 1602, strap 1618 is attached to mounting block 1604, and strap 1620 is attached to mounting block 1606. Mounting blocks 1602-1608 are attached to straps 1610, 1612, 1618, and 1620 by mechanical fasteners, adhesive fasteners, or any other method that would provide a secure attachment.

Removable cover 302 includes any of the embodiments disclosed in FIGS. 7-10.

In operation, a user would first place item 1626 on the flat surface provided by the combination of bin covers 122 and 124 and removable cover 302. The user would then connect straps 1612 and 1610 using connector 1614, and straps 1618 and 1620 using connector 1622. To tighten the straps and secure item 1626 in place, the user would pull on straps 1616 and 1624 until straps 1610, 1612, 1618, and 1620 were holding item 1626 such that item 1626 would not move around during transportation.

To remove item 1626, the user would squeeze connectors 1614 and 1622 in order to separate straps 1610 and 1612, and straps 1618 and 1620, respectively. Once item 1626 is no longer held securely in place, it can be slid off of the flat surface provided by the combination of bin covers 122 and 124 and removable cover 302.

In some instances, it may not be necessary to utilize straps 1610, 1612, 1618 and 1620 to secure an item, With mounting blocks 1602-1608 configured to receive large construction materials such as drywall or plywood, those items could simply be placed in between mounting blocks 16024608 such that mounting blocks 1602-1608 provide very little, if any, room for the items to move around during transportation.

Figure 17:
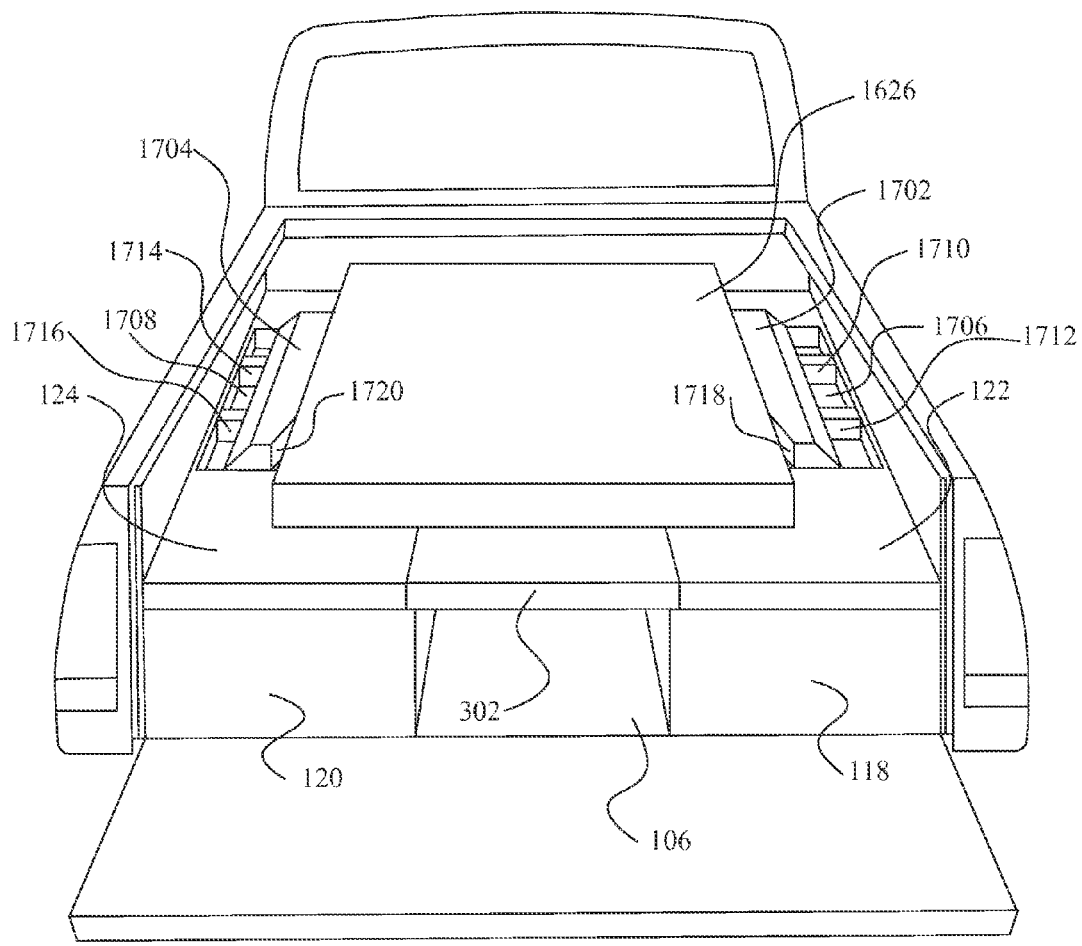
FIG. 17 is a perspective view of the storage system of FIG. 1 with means to secure items on top of the system according to a preferred embodiment of the present invention.

FIG. 17 is a perspective view of the storage system of FIG. 1 with means to secure items on top of the system according to a preferred embodiment of the present invention.

As shown in the figure, item 1626 is secured by brackets 1702 and 1704. Brackets 1702 and 1704 include tapered sections 1718 and 1720. Bin covers 122 and 124 include recesses 1706 and 1708. Compression components 1710-1716 push brackets 1702 and 1704 toward item 1626.

Brackets 1702 and 1704 are preferably constructed from plastic or metal, but may be constructed from any material suitable for an outdoor environment. Brackets 1702 and 1704 are sized to slide within recesses 1706 and 1708.

Tapered sections 1718 and 1720 provide a means by which item 1626 can push apart brackets 1702 and 1704 such that they are in the desired configuration.

Recesses 1706 and 1708 are integral with bin covers 122 and 124, and provide a space in which brackets 1702 and 1704 can freely slide.

Compression components 1710-1716 provide the force required to hold item 1626 in place. Compression components 1710-1716 may be spring loaded, with a design substantially similar to spacer 502 of FIG. 5a. Compression components 1710-1716 may also be hydraulically driven or magnetically driven. Compression components 1710-1716 are attached to both brackets 1702 and 1704 and recesses 1706 and 1708 by mechanical fasteners, adhesive fasteners, or other attachment means that would be suitable for the application.

In operation, a user would first place item 1626 on the flat surface provided by the combination of bin covers 122 and 124 and removable cover 302. The user would push item 1626 forward until it contacted tapered sections 1718 and 1720. The user would continue to push item 1626 forward, and the pushing force provided by the user would cause brackets 1702 and 1704 move outward, thus compressing compression components 1710-1716, as item 1626 moved along tapered sections 1718 and 1720. When item 1626 reaches the straight section of brackets 1702 and 1704, brackets 1702 and 1704 will no longer be pushed outward, and compression components 1710-1716 will not be compressed any further. The user will continue to push item 1626 until it is in the desired location. At this point, compression components 1710-1716 are pushing brackets 1702 and 1704 against item 1626, which prevents item 1626 from moving around during transportation.

To remove item 1626, the user would pull item 1626 until it is no longer engaged by brackets 1702 and 1704 or tapered sections 1718 and 1720. Item 1626 could then be slid off of the flat surface provided by the combination of bin covers 122 and 124 and removable cover 302.

Figure 18:
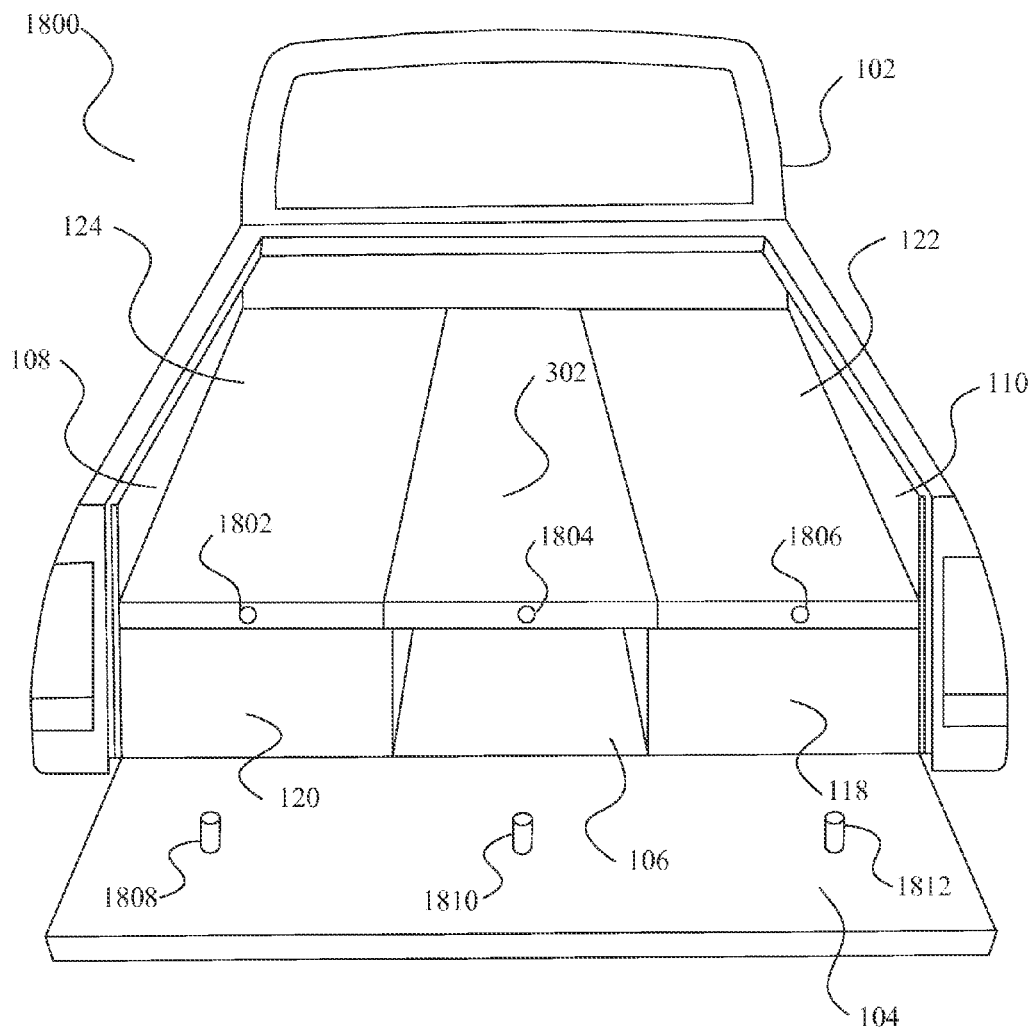
FIG. 18 is a perspective view of the storage system of FIG. 3 with means to lock the system according to a preferred embodiment of the present invention.

FIG. 18 is a perspective view of the storage system of FIG. 3 with means to lock the system according to a preferred embodiment of the present invention.

As shown in the figure, system 1800 includes holes 1802-1806 and posts 1808-1812. Hole 1802 is located in bin cover 124, hole 1804 is located in removable cover 302, and hole 1806 is located in bin cover 122. Posts 1808-1812 are located on tailgate 104.

Holes 1802-1806 are operable to receive posts 1808-1812, respectively. Holes 1802 and 1806 may be created during the manufacturing process to create bin covers 124 and 122, respectively, during a molding process or metal forming process. In addition, holes 1802 and 1806 may be created after bin covers 124 and 122 have been manufactured by drilling holes in the desired locations.

Posts 1808-1812 are operable to be inserted into holes 1802-1806, respectively. Posts 1808-1812 are preferably constructed from plastic or metal, or any other material suitable for an outdoor environment and the application. Posts 1808-1812 are bonded to tailgate 104 by using either mechanical fasteners or adhesive fasteners.

In operation, when tailgate 104 is in the open position, as shown, the user may open bin covers 122 and 124 to access storage bins 118 and 120, respectively, and open or remove removable cover 302. In this configuration the user may store items within storage bins 118 and 120 and underneath removable cover 302 on top of bed 106. To secure the items in those positions, the user would close tailgate 104. As tailgate 104 is closed, post 1808 is inserted into hole 1802, post 1810 is inserted into hole 1804, and post 1812 is inserted into hole 1806. When tailgate 104 is fully closed, posts 1808-1812 have been fully inserted into holes 1802-1806, respectively. In this configuration, bin covers 122 and 124 would not open because posts 1808 and 1812 would provide resistance and maintain bins 122 and 124 in the closed position. Additionally, removable cover 302 could not be opened or removed in this configuration because post 1810 would provide resistance and maintain removable cover 302 in the closed position. With system 1800 in this configuration, the user could be confident that the items stored would be secure and not at risk for theft.

It can be appreciated that the number, and position, of holes and posts may vary depending on the size of system 1800 and the preferences of the user.

In addition, it may be desirable to avoid the use of holes 1802-1806. In order to avoid the use of holes 1802-1806, posts 1808-1812 would be positioned in such a way as to protrude over the tops of bin covers 122 and 124 and removable cover 302 when tailgate 104 is in the closed position. In this configuration, bin covers 122 and 124 would not open because posts 1808 and 1812 would provide resistance and maintain bins 122 and 124 in the closed position. Additionally, removable cover 302 could not be opened or removed in this configuration because post 1810 would provide resistance and maintain removable cover 302 in the closed position.

In this configuration, it can be appreciated that the number, and position, of posts may vary depending on the size of system 1800 and the preferences of the user.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A system for storing items in the bed of a pickup truck, comprising:
    storage bins distributed along side walls of said bed of said pickup truck, said storage bins sized to cover at least 75% of the length of said bed extending from the back wall toward the tailgate of said pickup truck;
    an open section in between said storage bins;
    an open section cover, sized to cover said open section and sized to cover at least 75% of the length of said bed from said hack wall toward said tailgate of said pickup truck, attached to at least one of said storage bins for selectively covering said open section;
    means for stowing said open section cover when said open section cover is not covering said open section;
    means for securing items on top of said open section cover and the covers of said storage bins when said open section cover is covering said open section;
    at least one hole in said open section cover;
    at least one hole in said covers of said storage bins; and
    a plurality of posts attached to the tailgate of said pickup truck, wherein each of said posts corresponds to one of said holes in either said open section cover or said tops of said storage bins, wherein transitioning said tailgate from an open position to a closed position forces each of said posts to engage with each of said corresponding holes such that said open section cover cannot be removed and said storage bin tops cannot be opened when said tailgate is in the closed position.

2. The system of claim 1, further comprising: means for securing said storage bins to said pickup truck bed.

3. The system of claim 2, wherein said securing means are mechanical fasteners.

4. The system of claim 1, wherein said open section cover is rigid.

5. The system of claim 1, further comprising: attachment means to connect said open section cover to said storage bins.

6. The system of claim 5, wherein said open section cover is rigid.

7. The system of claim 1, further comprising: means for draining fluid that may enter said storage bins.

8. The system of claim 7, wherein said means for draining fluid is a drain hole.

9. The system of claim 1, further comprising: a locking mechanism to secure said open section cover to said storage bins.

* * * * *